US012685940B2

(12) United States Patent
Utsugi et al.

(10) Patent No.: US 12,685,940 B2
(45) Date of Patent: Jul. 21, 2026

(54) STORAGE MEDIUM, INFORMATION PROCESSING SYSTEM, AND INFORMATION PROCESSING METHOD

(71) Applicant: Nintendo Co., Ltd., Kyoto (JP)

(72) Inventors: Shun Utsugi, Kyoto (JP); Yuto Kobayashi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 350 days.

(21) Appl. No.: 18/500,656

(22) Filed: Nov. 2, 2023

(65) Prior Publication Data

US 2024/0149168 A1     May 9, 2024

(30) Foreign Application Priority Data

Nov. 9, 2022     (JP) ................................. 2022-179720

(51) Int. Cl.
| | |
|---|---|
| *A63F 13/69* | (2014.01) |
| *A63F 13/533* | (2014.01) |
| *A63F 13/803* | (2014.01) |

(52) U.S. Cl.
CPC ............ *A63F 13/69* (2014.09); *A63F 13/533* (2014.09); *A63F 13/803* (2014.09)

(58) Field of Classification Search
None
See application file for complete search history.

(56) References Cited

U.S. PATENT DOCUMENTS

| | | | | | |
|---|---|---|---|---|---|
| 2001/0018359 | A1* | 8/2001 | Izumi | ...................... | A63F 13/10 |
| | | | | | 463/43 |
| 2020/0023273 | A1* | 1/2020 | Tsurusaki | .............. | A63F 13/822 |

| | | | | | |
|---|---|---|---|---|---|
| 2020/0061470 | A1* | 2/2020 | Kidera | .................... | A63F 13/58 |
| 2020/0215437 | A1* | 7/2020 | Kidera | .................. | A63F 13/216 |
| 2022/0008819 | A1 | 1/2022 | Konishi | | |

FOREIGN PATENT DOCUMENTS

| | | | |
|---|---|---|---|
| JP | 2017-010335 | A | 1/2017 |
| JP | 2018-166679 | A | 11/2018 |
| JP | 2020-099768 | A | 7/2020 |
| JP | 2022015061 | A | 1/2022 |
| JP | 2022-039219 | A | 3/2022 |
| JP | 2022-077232 | A | 5/2022 |
| JP | 2022-150221 | A | 10/2022 |

OTHER PUBLICATIONS

Notice of Reasons for Refusal issued on Feb. 19, 2026 for Japanese Patent Application No. 2022-179720 and its machine translation in English, 15 pages.
Nintendo64 Perfect Strategy Series ▲4▼ Mariokart 64 Victory Strategy, 2nd Edition, Japan, Futabasha Publishers Ltd., May 30, 1998, p. 18-19.

* cited by examiner

*Primary Examiner* — Damon J Pierce

(74) *Attorney, Agent, or Firm* — Nixon & Vanderhye, PC

(57)     ABSTRACT

An example of a game system sets appearable items from among a plurality of types of items causing effects in a game, based on selection by a user, and gives any item from among the appearable items to a game object based on first data that is set in correspondence with a game situation, when the game object satisfies a predetermined condition. When any item cannot be given from among the appearable items based on the first data, the game system gives any item from among the appearable items based on second data.

20 Claims, 21 Drawing Sheets

ADDITION TABLE OBTAINED BY MAKING ADDITION TO DEGREES OF EASE OF APPEARING FOR APPEARABLE ITEMS (WHEN ITEMS A TO C, K, AND L ARE SET TO ON)

| ITEM | DEGREE OF EASE OF APPEARING (BEFORE ADDITION) | ADDITION VALUE | DEGREE OF EASE OF APPEARING (AFTER ADDITION) | PROBABILITY OF APPEARING |
|---|---|---|---|---|
| A | 3 | 1 | 4 | 4/11 |
| B | 2 | 1 | 3 | 3/11 |
| C | 1 | 1 | 2 | 2/11 |
| D | 0 | — | 0 | 0 |
| E | 0 | — | 0 | 0 |
| F | 0 | — | 0 | 0 |
| G | 0 | — | 0 | 0 |
| H | 0 | — | 0 | 0 |
| I | 0 | — | 0 | 0 |
| J | 0 | — | 0 | 0 |
| K | 0 | 1 | 1 | 1/11 |
| L | 0 | 1 | 1 | 1/11 |

FIG. 5

SITUATION TABLE FOR FIRST GAME

| GAME SITUATION (RANKING) | ITEM | DEGREE OF EASE OF APPEARING | PROBABILITY OF APPEARING |
|---|---|---|---|
| 1 | A | 0 | 0 |
| | B | 0 | 0. |
| | C | 0.5 | 0.5/8 |
| | D | 0.5 | 0.5/8 |
| | E | 1 | 1/8 |
| | . . | . . | . . |
| 2 | A | 0 | 0 |
| | B | 1 | 1/10 |
| | C | 1 | 1/10 |
| | D | 1.5 | 1.5/10 |
| | E | 2 | 2/10 |
| | . . | . . | . . |
| | . . | | . . |
| 8 | A | 2 | 2/12 |
| | B | 2 | 2/12 |
| | C | 1 | 1/12 |
| | D | 1 | 1/12 |
| | E | 3 | 3/12 |
| | . . | . . | . . |

FIG. 6                ITEM SETTING SCREEN
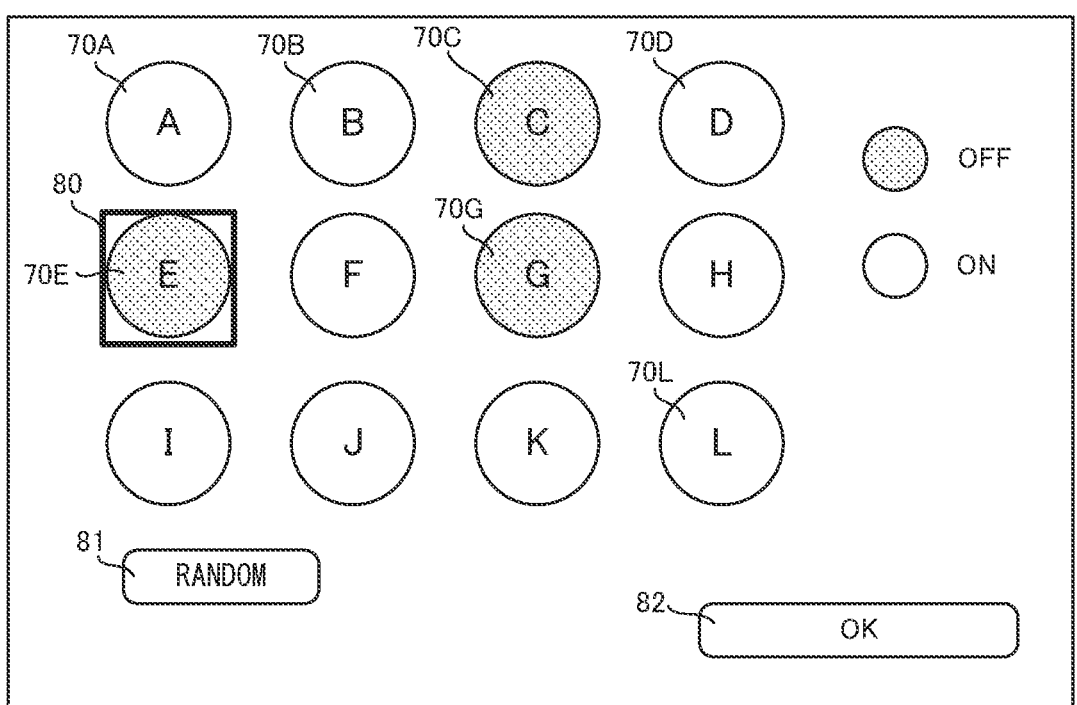
FIG. 7                ITEM SETTING SCREEN
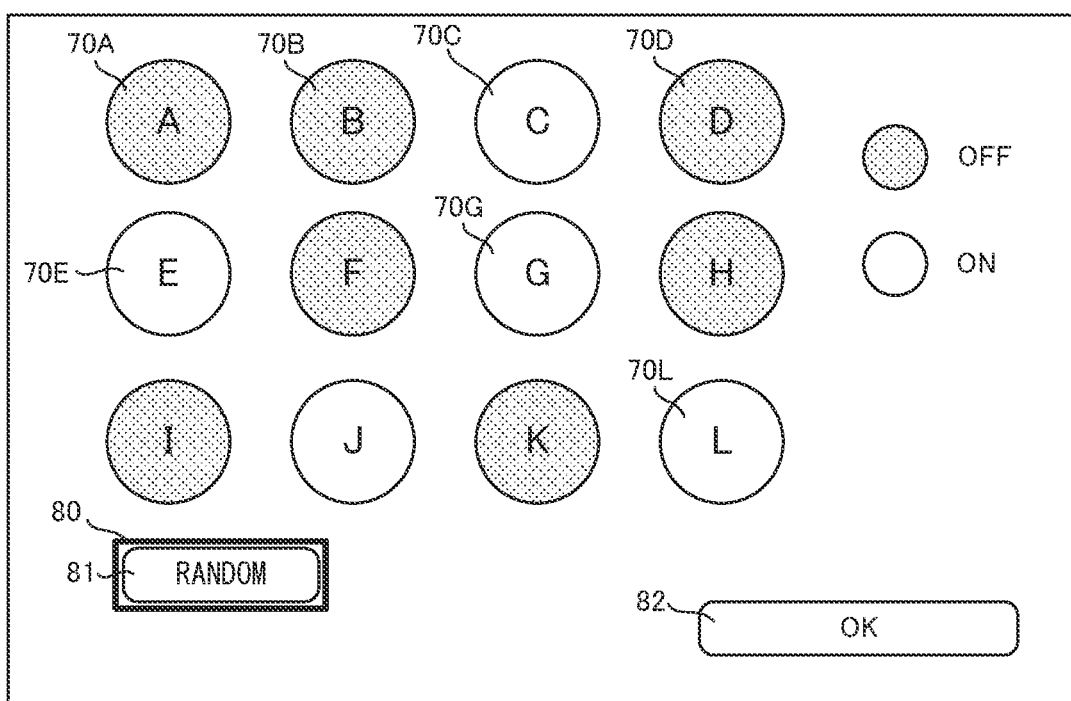

FIG. 8

SITUATION TABLE FOR EIGHTH RANKING

| GAME SITUATION (RANKING) | ITEM | DEGREE OF EASE OF APPEARING | PROBABILITY OF APPEARING |
|---|---|---|---|
| 8 | A | 2 | 2/12 |
| | B | 2 | 2/12 |
| | C | 1 | 1/12 |
| | D | 1 | 1/12 |
| | E | 3 | 3/12 |
| | F | 1 | 1/12 |
| | G | 1 | 1/12 |
| | H | 0.5 | 0.5/12 |
| | I | 0.5 | 0.5/12 |
| | J | 0 | 0 |
| | K | 0 | 0 |
| | L | 0 | 0 |

FIG. 9

CORRECTED TABLE AFTER SITUATION TABLE FOR EIGHTH RANKING IS APPLIED
TO APPEARABLE ITEMS(WHEN B TO E ARE SET TO OFF, AND ITEM A HAS
REACHED UPPER LIMIT NUMBER)

| GAME SITUATION (RANKING) | ITEM | DEGREE OF EASE OF APPEARING | PROBABILITY OF APPEARING |
|---|---|---|---|
| 8 | A | 0 | 0 |
| | B | 0 | 0 |
| | C | 0 | 0 |
| | D | 0 | 0 |
| | E | 0 | 0 |
| | F | 1 | 1/3 |
| | G | 1 | 1/3 |
| | H | 0.5 | 0.5/3 |
| | I | 0.5 | 0.5/3 |
| | J | 0 | 0 |
| | K | 0 | 0 |
| | L | 0 | 0 |

FIG. 10

TABLE WHEN ITEM CANNOT BE GIVEN FROM AMONG APPEARABLE ITEMS (WHEN ITEMS B TO I ARE SET TO OFF, AND ITEM A HAS REACHED UPPER LIMIT NUMBER)

| GAME SITUATION (RANKING) | ITEM | DEGREE OF EASE OF APPEARING | PROBABILITY OF APPEARING |
|---|---|---|---|
| 3 | A | 0 | 0 |
| | B | 0 | 0 |
| | C | 0 | 0 |
| | D | 0 | 0 |
| | E | 0 | 0 |
| | F | 0 | 0 |
| | G | 0 | 0 |
| | H | 0 | 0 |
| | I | 0 | 0 |
| | J | 0 | 0 |
| | K | 0 | 0 |
| | L | 0 | 0 |

FIG. 11

EQUAL PROBABILITY TABLE (WHEN ITEMS B TO I ARE SET TO OFF, AND ITEM A HAS REACHED UPPER LIMIT NUMBER)

| ITEM | DEGREE OF EASE OF APPEARING | PROBABILITY OF APPEARING |
|---|---|---|
| A | 0 | 0 |
| B | 0 | 0 |
| C | 0 | 0 |
| D | 0 | 0 |
| E | 0 | 0 |
| F | 0 | 0 |
| G | 0 | 0 |
| H | 0 | 0 |
| I | 0 | 0 |
| J | 1 | 1/3 |
| K | 1 | 1/3 |
| L | 1 | 1/3 |

FIG. 12

EXCEPTION TABLE

| ITEM | DEGREE OF EASE OF APPEARING | PROBABILITY OF APPEARING |
|---|---|---|
| A | 0 | 0 |
| B | 0 | 0 |
| C | 0 | 0 |
| D | 0 | 0 |
| E | 3 | 3/6 |
| F | 2 | 2/6 |
| G | 1 | 1/6 |
| H | 0 | 0 |
| I | 0 | 0 |
| J | 0 | 0 |
| K | 0 | 0 |
| L | 0 | 0 |

FIG. 13

SITUATION TABLE FOR MODE A IN SECOND GAME

| GAME SITUATION (POINT RANKING) | ITEM | DEGREE OF EASE OF APPEARING | PROBABILITY OF APPEARING |
|---|---|---|---|
| 8 | A | 3 | 3/10 |
| | B | 2 | 2/10 |
| | C | 1 | 1/10 |
| | D | 1.5 | 1.5/10 |
| | E | 1.5 | 1.5/10 |
| | F | 1 | 1/10 |
| | G | 0 | 0 |
| | H | 0 | 0 |
| | I | 0 | 0 |
| | J | 0 | 0 |
| | K | 0 | 0 |
| | L | 0 | 0 |
| 7 | A | 1 | 1/10 |
| | B | 1.5 | 1.5/10 |
| | C | 1.5 | 1.5/10 |
| | D | 2 | 2/10 |
| | E | 2 | 2/10 |
| | F | 2 | 2/10 |
| | G | 0 | 0 |
| | H | 0 | 0 |
| | I | 0 | 0 |
| | J | 0 | 0 |
| | K | 0 | 0 |
| | L | 0 | 0 |
| . . | . . | . . | . . |

FIG. 14

SITUATION TABLE FOR MODE B IN SECOND GAME

| GAME SITUATION (POINT RANKING) | ITEM | DEGREE OF EASE OF APPEARING | PROBABILITY OF APPEARING |
|---|---|---|---|
| 8 | A | 0 | 0 |
| | B | 0 | 0 |
| | C | 0 | 0 |
| | D | 0 | 0 |
| | E | 0 | 0 |
| | F | 0 | 0 |
| | G | 0.5 | 0.5/10 |
| | H | 1 | 1/10 |
| | I | 1.5 | 1.5/10 |
| | J | 2 | 2/10 |
| | K | 2 | 2/10 |
| | L | 3 | 3/10 |
| 7 | A | 0 | 0 |
| | B | 0 | 0 |
| | C | 0 | 0 |
| | D | 0 | 0 |
| | E | 0 | 0 |
| | F | 0 | 0 |
| | G | 1 | 1/10 |
| | H | 1.5 | 1.5/10 |
| | I | 1.5 | 1.5/10 |
| | J | 2 | 2/10 |
| | K | 2 | 2/10 |
| | L | 2 | 2/10 |
| . . | . . | . . | . . |

FIG. 15

ADDITION TABLE OBTAINED BY MAKING ADDITION TO DEGREES OF EASE OF
APPEARING FOR APPEARABLE ITEMS (WHEN ITEMS A TO C, K, AND L ARE SET
TO ON)

| ITEM | DEGREE OF EASE OF APPEARING (BEFORE ADDITION) | ADDITION VALUE | DEGREE OF EASE OF APPEARING (AFTER ADDITION) | PROBABILITY OF APPEARING |
|---|---|---|---|---|
| A | 3 | 1 | 4 | 4/11 |
| B | 2 | 1 | 3 | 3/11 |
| C | 1 | 1 | 2 | 2/11 |
| D | 0 | – | 0 | 0 |
| E | 0 | – | 0 | 0 |
| F | 0 | – | 0 | 0 |
| G | 0 | – | 0 | 0 |
| H | 0 | – | 0 | 0 |
| I | 0 | – | 0 | 0 |
| J | 0 | – | 0 | 0 |
| K | 0 | 1 | 1 | 1/11 |
| L | 0 | 1 | 1 | 1/11 |

FIG. 16

WHEN ANY ITEM CANNOT BE GIVEN FROM AMONG APPEARABLE ITEMS (WHEN ITEMS A, K, AND L ARE SET TO ON, AND ITEM A HAS REACHED UPPER LIMIT)

| ITEM | DEGREE OF EASE OF APPEARING (BEFORE ADDITION) | ADDITION VALUE | DEGREE OF EASE OF APPEARING (AFTER ADDITION) | PROBABILITY OF APPEARING |
|---|---|---|---|---|
| A | 0 | – | 0 | 0 |
| B | 0 | – | 0 | 0 |
| C | 0 | – | 0 | 0 |
| D | 0 | – | 0 | 0 |
| E | 0 | – | 0 | 0 |
| F | 0 | – | 0 | 0 |
| G | 0 | – | 0 | 0 |
| H | 0 | – | 0 | 0 |
| I | 0 | – | 0 | 0 |
| J | 0 | – | 0 | 0 |
| K | 0 | 0 | 0 | 0 |
| L | 0 | 0 | 0 | 0 |

FIG. 17

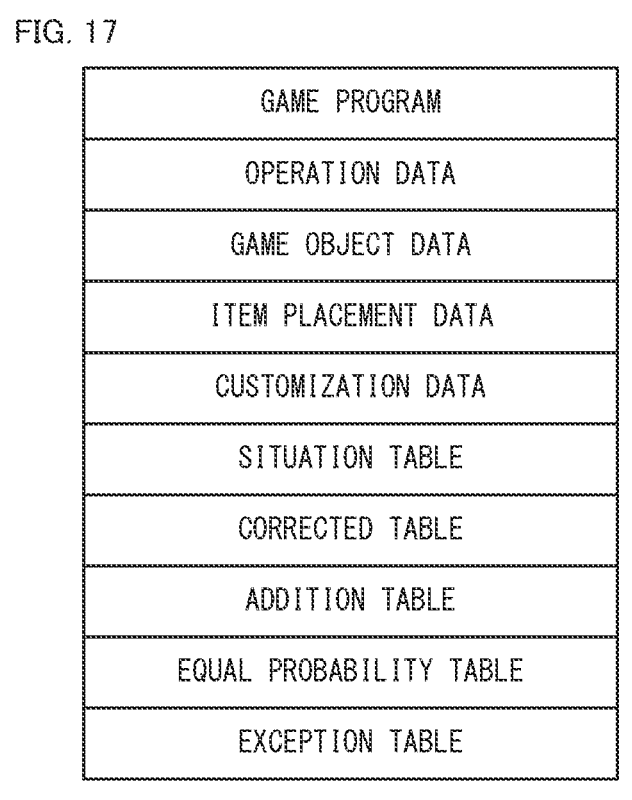

| |
|---|
| GAME PROGRAM |
| OPERATION DATA |
| GAME OBJECT DATA |
| ITEM PLACEMENT DATA |
| CUSTOMIZATION DATA |
| SITUATION TABLE |
| CORRECTED TABLE |
| ADDITION TABLE |
| EQUAL PROBABILITY TABLE |
| EXCEPTION TABLE |

FIG. 22

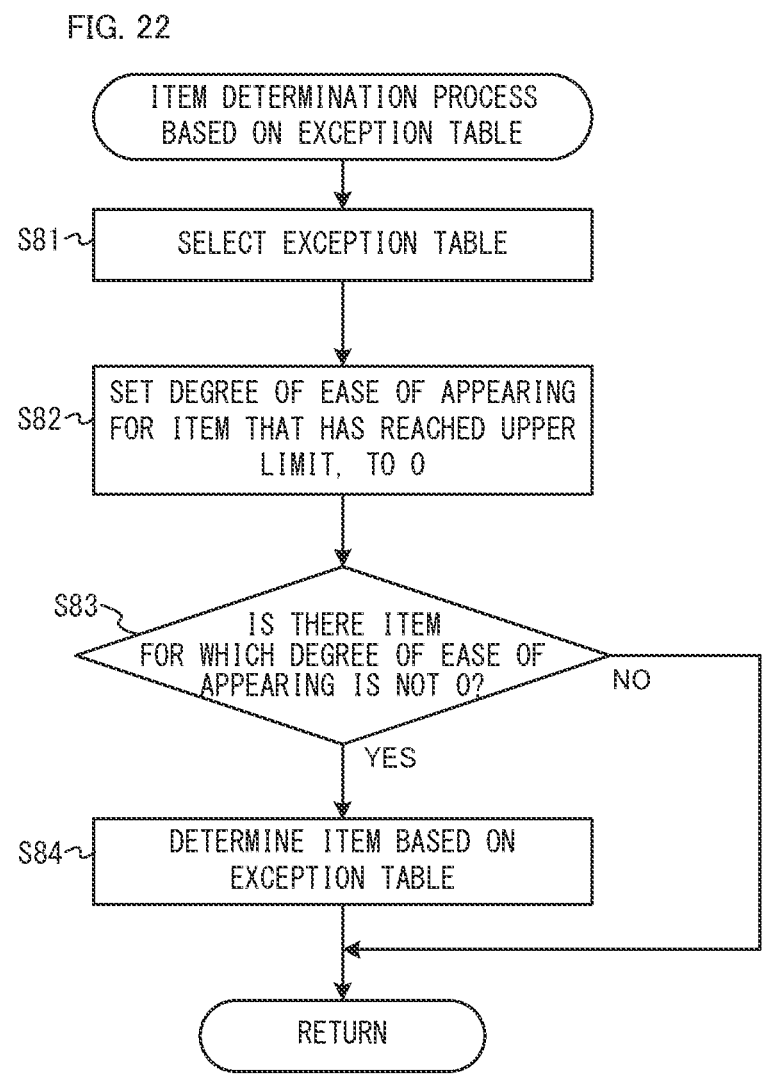

```
        ┌─────────────────────────────────┐
        │   ITEM DETERMINATION PROCESS    │
        │   BASED ON EXCEPTION TABLE      │
        └─────────────────────────────────┘
                        │
                        ▼
        ┌─────────────────────────────────┐
   S81  │      SELECT EXCEPTION TABLE     │
        └─────────────────────────────────┘
                        │
                        ▼
        ┌─────────────────────────────────┐
        │  SET DEGREE OF EASE OF APPEARING│
   S82  │ FOR ITEM THAT HAS REACHED UPPER │
        │          LIMIT, TO 0            │
        └─────────────────────────────────┘
                        │
                        ▼
                    ╱        ╲
   S83           ╱   IS THERE   ╲
              ╱  ITEM FOR WHICH    ╲       NO
            ╱  DEGREE OF EASE OF      ╲──────────┐
            ╲  APPEARING IS NOT 0?    ╱          │
              ╲                     ╱            │
                ╲        ╱                       │
                    │ YES                        │
                    ▼                            │
        ┌─────────────────────────────────┐      │
   S84  │   DETERMINE ITEM BASED ON       │      │
        │       EXCEPTION TABLE           │      │
        └─────────────────────────────────┘      │
                        │◄────────────────────────┘
                        ▼
        ┌─────────────────────────────────┐
        │            RETURN               │
        └─────────────────────────────────┘
```

FIG. 25

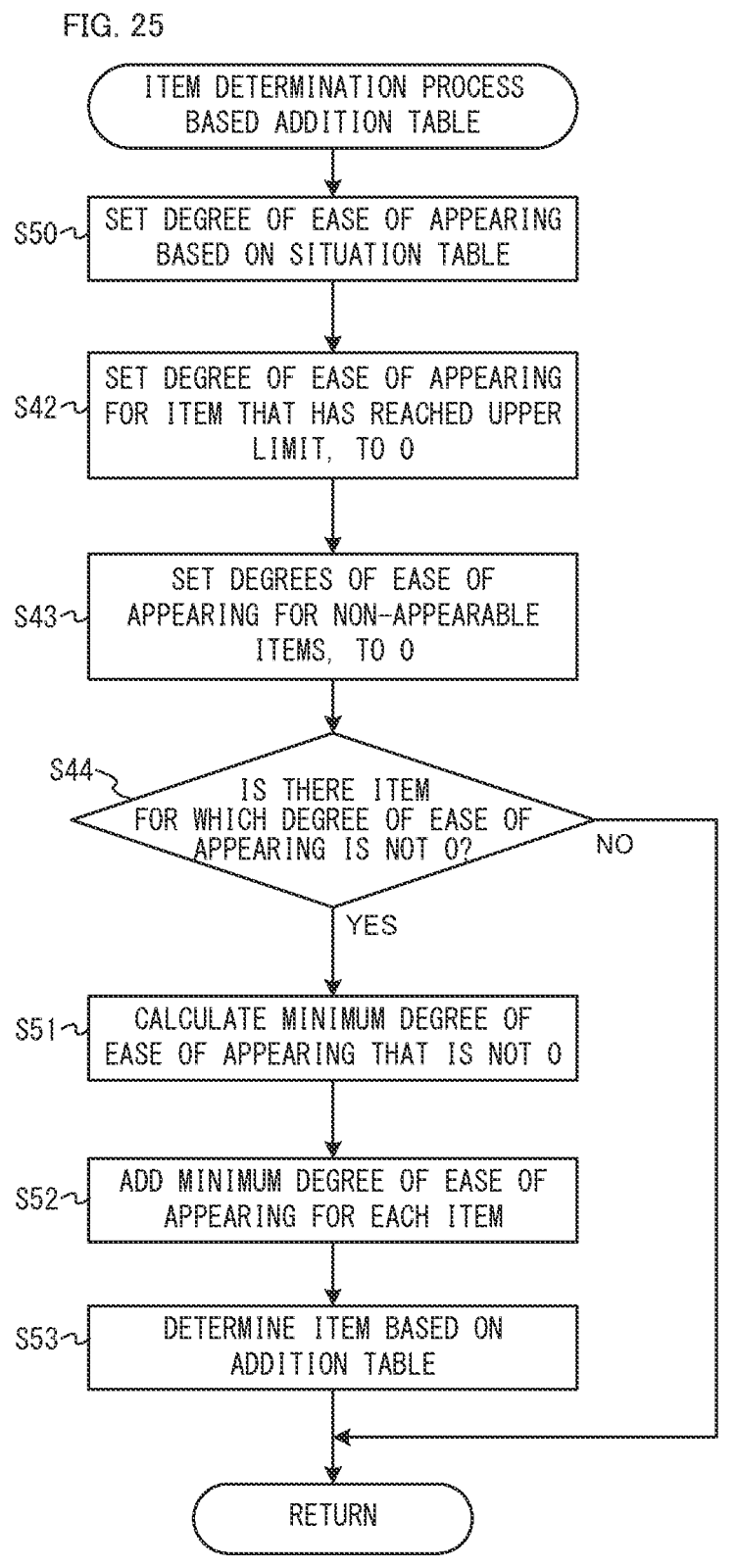

```
        ┌─────────────────────────────────┐
        │  ITEM DETERMINATION PROCESS     │
        │   BASED ADDITION TABLE          │
        └─────────────────────────────────┘
                       │
                       ▼
       ┌──────────────────────────────────┐
 S50 ──│  SET DEGREE OF EASE OF APPEARING  │
       │  BASED ON SITUATION TABLE         │
       └──────────────────────────────────┘
                       │
                       ▼
       ┌──────────────────────────────────┐
 S42 ──│  SET DEGREE OF EASE OF APPEARING  │
       │  FOR ITEM THAT HAS REACHED UPPER  │
       │  LIMIT, TO 0                      │
       └──────────────────────────────────┘
                       │
                       ▼
       ┌──────────────────────────────────┐
 S43 ──│  SET DEGREES OF EASE OF           │
       │  APPEARING FOR NON-APPEARABLE     │
       │  ITEMS, TO 0                      │
       └──────────────────────────────────┘
                       │
                       ▼
              ╱──────────────────╲
             ╱   IS THERE ITEM     ╲      NO
 S44 ──────⟨  FOR WHICH DEGREE OF EASE OF ⟩────┐
             ╲  APPEARING IS NOT 0? ╱          │
              ╲──────────────────╱             │
                       │ YES                   │
                       ▼                       │
       ┌──────────────────────────────────┐   │
 S51 ──│  CALCULATE MINIMUM DEGREE OF      │   │
       │  EASE OF APPEARING THAT IS NOT 0  │   │
       └──────────────────────────────────┘   │
                       │                       │
                       ▼                       │
       ┌──────────────────────────────────┐   │
 S52 ──│  ADD MINIMUM DEGREE OF EASE OF    │   │
       │  APPEARING FOR EACH ITEM          │   │
       └──────────────────────────────────┘   │
                       │                       │
                       ▼                       │
       ┌──────────────────────────────────┐   │
 S53 ──│  DETERMINE ITEM BASED ON          │   │
       │  ADDITION TABLE                   │   │
       └──────────────────────────────────┘   │
                       │                       │
                       ◄───────────────────────┘
                       │
                       ▼
             ┌──────────────────┐
             │      RETURN       │
             └──────────────────┘
```

STORAGE MEDIUM, INFORMATION PROCESSING SYSTEM, AND INFORMATION PROCESSING METHOD

CROSS REFERENCE TO RELATED APPLICATION

This application claims priority to Japanese Patent Application No. 2022-179720, filed on Nov. 9, 2022, the entire contents of which are incorporated herein by reference.

FIELD

The exemplary embodiments herein relate to one or more computer-readable media having a game program stored therein, an information processing system, and an information processing method that are capable of executing a game using items.

BACKGROUND AND SUMMARY

There are conventional games in each of which any of multiple types of items are caused to appear in a virtual space during the game.

In the above conventional games, it is conceivable, for example, to determine any item from among multiple types of items by random selection. For example, it is conceivable to change the probability of random selection of an item according to the game situation, but there is room for improvement in order to further enhance the entertainment characteristics of the game.

Therefore, an object of the exemplary embodiments is to provide one or more computer-readable media having a game program stored therein, an information processing system, and an information processing method that are capable of executing a novel game in a game using items.

To achieve the above object, the exemplary embodiments employ the following configurations.

First Configuration

A first configuration is directed to a non-transitory computer-readable storage medium having stored therein instructions that, when executed, cause a computer to execute game processing of a game in which a plurality of game objects including at least one player object operated by a user compete against each other, the game processing including:

setting one or more appearable items capable of appearing during the game, from an item group including a plurality of types of items causing effects in the game, randomly or based on selection by the user;

when the game object satisfies a predetermined condition during the game, determining an item to be given to the game object from the item group; and giving the determined item to be given, to the game object, the determining the item to be given including a first process of determining the item to be given from among the appearable items based on first data in which a parameter indicating a degree of ease of being given is set for each of the plurality of items included in the item group in correspondence with a game situation, and a second process of determining the item to be given from among the appearable items based on second data different from the first data, when it is not possible to determine the item to be given from among the appearable items based on the first data.

According to the above, appearable items can be set randomly or based on selection by the user. When a game object satisfies the predetermined condition, any item can be given from among the appearable items to the game object according to the game situation. In addition, when an item cannot be given from among the appearable items based on the first data, an item can be given from among the appearable items based on the second data.

Second Configuration

In a second configuration, in the above first configuration, the game processing may further include a third process of setting a degree of ease of being given for each of the appearable items based on the first data, and the first process may be executed based on the set degree of ease of being given for each of the appearable items after the third process.

According to the above, a degree of ease of being given can be set for each appearable item, and an item to be given can be determined from among the appearable items based on the degree of ease of being given for each appearable item.

Third Configuration

In a third configuration, in the above first or second configuration, the game processing may further include executing the game in an item-fixed mode in which, in the determining the item to be given, any item is determined as the item to be given from among a plurality of types of fixed items in correspondence with a game situation, and the first data may be data used to determine any item from among the plurality of types of fixed items, as the item to be given, when the game is executed in the item-fixed mode.

According to the above, the game can be executed in the item-fixed mode. The first data is data used to determine an item to be given in the item-fixed mode. That is, even when appearable items are set randomly or based on selection by the user, an item to be given can be determined from among the appearable items based on the first data common to the item-fixed mode.

Fourth Configuration

In a fourth configuration, in the above third configuration, in the first data, the parameter of a first item may be set to a value indicating that the item is capable of being given, and the parameter of a second item may be set to a value indicating that the item is not capable of being given, and when the appearable items include the second item, the parameter of the second item may be set to a value indicating that the item is capable of being given.

According to the above, even the second item which cannot be given based on the first data can be given when the second item is set as an appearable item.

Fifth Configuration

In a fifth configuration, in the above fourth configuration, when the appearable items include the first item and the second item, the parameter of the second item may be set to a value indicating that the item is capable of being given, and the parameter of the first item may be set such that a degree of ease of being given for the first item is increased.

According to the above, a value indicating that the item is capable of being given can be set for the second item, and the degree of ease of being given for the first item can be increased. Accordingly, the second item which originally cannot be given can be prevented from being relatively excessively given.

Sixth Configuration

In a sixth configuration, in the above fourth or fifth configuration, when the appearable items include at least one first item, the parameter of the second item may be set based on a lowest degree of ease of being given among said at least one first item.

According to the above, since the parameter of the second item is set based on the lowest degree of ease of being given, the second item can be prevented from being excessively given.

Seventh Configuration

In a seventh configuration, in any one of the above first to sixth configurations, the second data may be data for determining any item from among the appearable items with an equal probability.

According to the above, in the second process, an item to be given can be determined from among the appearable items with the same probability. An item to be given can be determined from among the appearable items according to the game situation while priority is given to the first process, and when an item to be given cannot be determined in the first process, an item to be given is determined from among the appearable items with an equal probability, whereby an item to be given can be determined with an appropriate probability as a whole.

Eighth Configuration

In an eighth configuration, in any one of the above first to seventh configurations, each of the plurality of game objects may belong to any of a plurality of teams, the game may be a game in which the plurality of teams compete against each other, and the appearable items may be set for each team in the setting of the appearable items.

According to the above, appearable items can be set for each team, so that the entertainment characteristics of the game in a team competition can be improved.

Ninth Configuration

In a ninth configuration, in any one of the above first to eighth configurations, an upper limit number of items that can exist during the game may be set for each of the plurality of types of items, and, in the determining the item to be given, an item whose number of items existing during the game is less than the upper limit number, among the appearable items, may be determined as the item to be given.

According to the above, an item that has reached the upper limit number can be prevented from being given, so that a specific item can be prevented from being excessively given.

Tenth Configuration

In a tenth configuration, in the above ninth configuration, when all the appearable items each have reached the upper limit number, any item may be determined from among one or more predetermined items included in the item group, as the item to be given, regardless of whether said one or more predetermined items are set as the appearable items.

According to the above, even when appearable items are set, an item can be reliably given.

Another configuration may be an information processing system, an information processing apparatus, or an information processing method for executing the above game processing.

According to the exemplary embodiments, it is possible to set appearable items, and when a game object satisfies a predetermined condition, an item to be given can be determined from among the set appearable items according to the game situation.

These and other objects, features, aspects and advantages of the exemplary embodiment will become more apparent from the following detailed description when taken in conjunction with the accompanying drawings.

BRIEF DESCRIPTION OF THE DRAWINGS

FIG. 5 is an example non-limiting diagram showing an example of a situation table for the first game;

FIG. 6 is an example non-limiting diagram showing an example of an item setting screen;

FIG. 7 is an example non-limiting diagram showing how items are randomly set on the item setting screen;

FIG. 8 is an example non-limiting diagram showing an example of a pre-stored situation table for eighth ranking;

FIG. 9 is an example non-limiting diagram showing an example of a corrected table obtained by correcting the pre-stored situation table for eighth ranking;

FIG. 10 is an example non-limiting diagram showing an example of a corrected table when any item cannot be given from among appearable items;

FIG. 11 is an example non-limiting diagram showing an example of an equal probability table;

FIG. 12 is an example non-limiting diagram showing an example of an exception table;

FIG. 13 is an example non-limiting diagram showing an example of a pre-stored situation table used when a second game is executed in mode A;

FIG. 14 is an example non-limiting diagram showing an example of a pre-stored situation table used when the second game is executed in mode B;

FIG. 15 is an example non-limiting diagram showing an example of an addition table obtained by adding a degree of ease of appearing for each appearable item;

FIG. 16 is an example non-limiting diagram showing an example of an addition table when any item cannot be given from among appearable items in the second game;

FIG. 17 is an example non-limiting diagram showing an example of various kinds of data stored in a memory of a game system 1;

FIG. 22 is an example non-limiting flowchart showing an example of an item determination process based on an exception table in step S27;

FIG. 25 is an example non-limiting flowchart showing an example of an item determination process based on an addition table in step S32.

DETAILED DESCRIPTION OF NON-LIMITING EXAMPLE EMBODIMENTS

Game System Configuration

Figure 1:
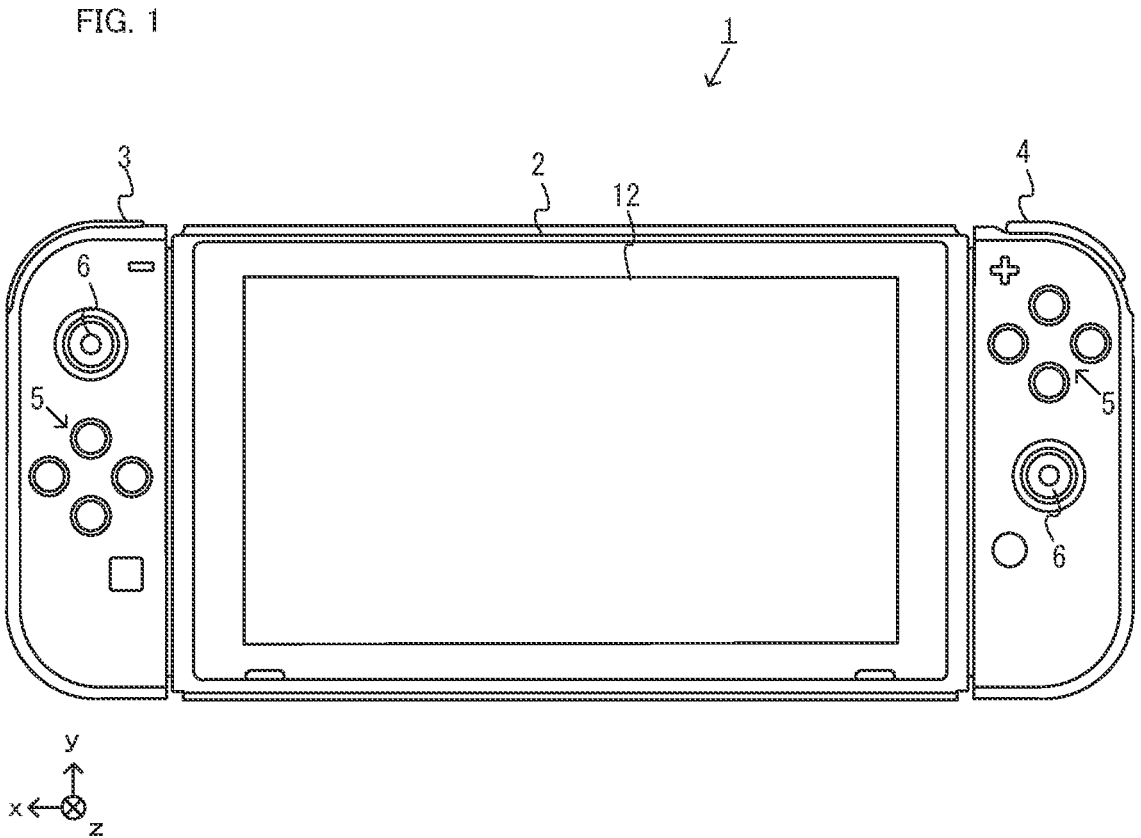
FIG. 1 is an example non-limiting diagram showing an example of a game system.

A game system according to an example of an exemplary embodiment is described below. FIG. 1 is a diagram showing an exemplary game system. An example of a game system 1 according to the exemplary embodiment includes a main body apparatus (an information processing apparatus; which functions as a game apparatus main body in the exemplary embodiment) 2, a left controller 3, and a right controller 4. The main body apparatus 2 is an apparatus for performing various processes (e.g., game processing) in the game system 1. The left controller 3 and the right controller 4 each include a plurality of buttons 5 and an analog stick 6, as exemplary operation units through which a user performs input.

Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2, or the main body apparatus 2, the left controller 3, and the right controller 4 may be separated from one another, when being used. It should be noted that hereinafter, the left controller 3 and the right controller 4 will occasionally be referred to collectively as a "controller".

Figure 2:
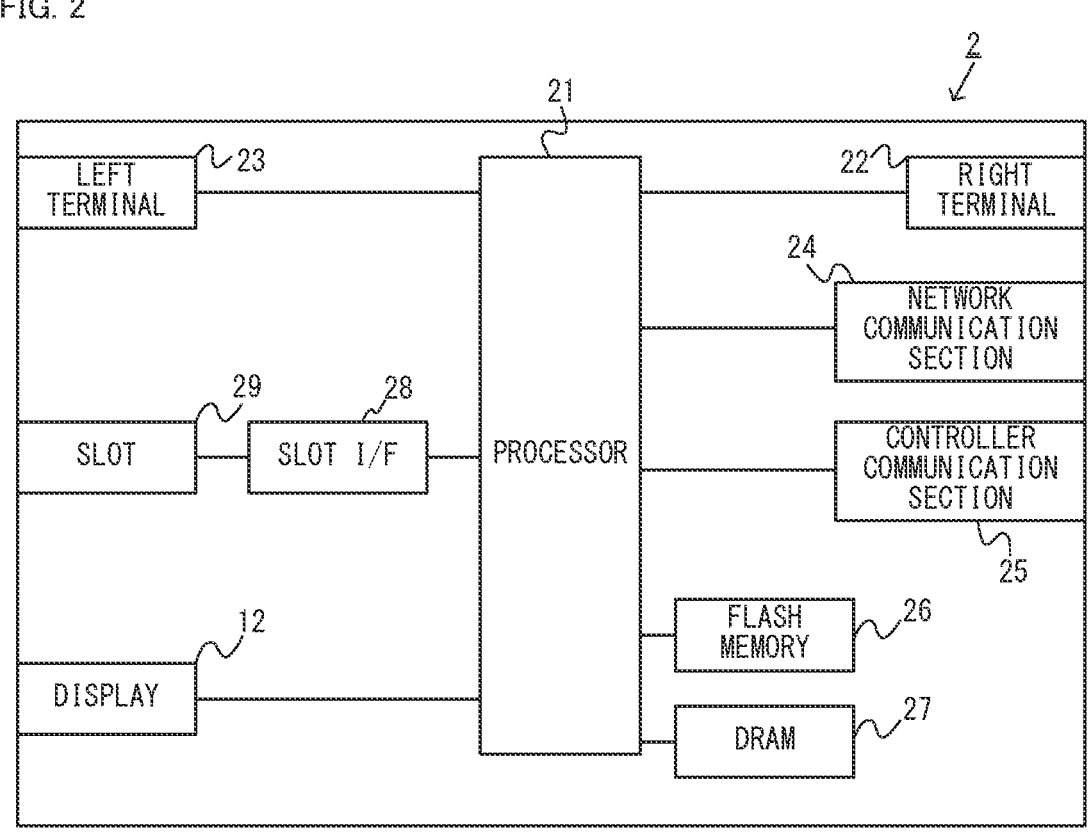
FIG. 2 is an example non-limiting block diagram showing an example of the internal configuration of a main body apparatus.

FIG. 2 is a block diagram showing an example of the internal configuration of the main body apparatus 2. As shown in FIG. 2, the main body apparatus 2 includes a processor 21. The processor 21 is an information processing section for executing various types of information processing (e.g., game processing) to be executed by the main body apparatus 2, and for example, includes a CPU (Central Processing Unit) and a GPU (Graphics Processing Unit). Note that the processor 21 may be configured only by a CPU, or may be configured by a SoC (System-on-a-Chip) that includes a plurality of functions such as a CPU function and a GPU function. The processor 21 executes an information processing program (e.g., a game program) stored in a storage section (specifically, an internal storage medium such as a flash memory 26, an external storage medium attached to the slot 29, or the like), thereby performing the various types of information processing.

Further, the main body apparatus 2 also includes a display 12. The display 12 displays an image generated by the main body apparatus 2. In the exemplary embodiment, the display 12 is a liquid crystal display device (LCD). The display 12, however, may be a display device of any type. The display 12 is connected to the processor 21. The processor 21 displays a generated image (e.g., an image generated by executing the above information processing) and/or an externally acquired image on the display 12.

Further, the main body apparatus 2 includes a left terminal 23, which is a terminal for the main body apparatus 2 to perform wired communication with the left controller 3, and a right terminal 22, which is a terminal for the main body apparatus 2 to perform wired communication with the right controller 4.

Further, the main body apparatus 2 includes a flash memory 26 and a DRAM (Dynamic Random Access Memory) 27 as examples of internal storage media built into the main body apparatus 2. The flash memory 26 and the DRAM 27 are connected to the processor 21. The flash memory 26 is a memory mainly used to store various data (or programs) to be saved in the main body apparatus 2. The DRAM 27 is a memory used to temporarily store various data used for information processing.

The main body apparatus 2 includes a slot 29. The slot 29 is so shaped as to allow a predetermined type of storage medium to be attached to the slot 29. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of a game application or the like) used by the main body apparatus 2 and/or a program (e.g., a game program or the like) executed by the main body apparatus 2.

The main body apparatus 2 includes a slot interface (hereinafter abbreviated as "I/F") 28. The slot I/F 28 is connected to the processor 21. The slot I/F 28 is connected to the slot 29, and in accordance with an instruction from the processor 21, reads and writes data from and to the predetermined type of storage medium (e.g., a dedicated memory card) attached to the slot 29.

The processor 21 appropriately reads and writes data from and to the flash memory 26, the DRAM 27, and each of the above storage media, thereby performing the above information processing.

The main body apparatus 2 includes a network communication section 24. The network communication section 24 is connected to the processor 21. The network communication section 24 performs wired or wireless communication with an external apparatus via a network. In the exemplary embodiment, as a first communication form, the network communication section 24 connects to a wireless LAN and communicates with an external apparatus, using a method compliant with the Wi-Fi standard. Further, as a second communication form, the network communication section 24 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 25. The controller communication section 25 is connected to the processor 21. The controller communication section 25 wirelessly communicates with the left controller 3 and/or the right controller 4. The communication method between the main body apparatus 2 and the left controller 3 and the right controller 4 is optional. In the exemplary embodiment, the controller communication section 25 performs communication compliant with the Bluetooth (registered trademark) standard with the left controller 3 and with the right controller 4.

The processor 21 is connected to the left terminal 23 and the right terminal 22. When performing wired communication with the left controller 3, the processor 21 transmits data to the left controller 3 via the left terminal 23 and also receives operation data from the left controller 3 via the left terminal 23. Further, when performing wired communication with the right controller 4, the processor 21 transmits data to the right controller 4 via the right terminal 22 and also receives operation data from the right controller 4 via the right terminal 22. As described above, in the exemplary embodiment, the main body apparatus 2 can perform both wired communication and wireless communication with each of the left controller 3 and the right controller 4.

It should be noted that, in addition to the elements shown in FIG. 2, the main body apparatus 2 includes a battery that supplies power and an output terminal for outputting images and audio to a display device (e.g., a television) separate from the display 12.

Outline of Game

Next, an outline of game processing executed in the game system 1 will be described. In the exemplary embodiment, a game in which a plurality of game objects including at least one player object operated by a player compete against each other, is performed.

Each of the game objects may be an object that moves on the ground, such as a car, motorcycle, bicycle, or tank carrying a character object, or may be an object that moves on water or underwater, such as a ship, a boat, or a submarine. Each of the game objects may be an object that moves in the air, such as an airplane, a helicopter, or a glider. Moreover, each of the game objects may be a character object itself.

In the exemplary embodiment, for example, a first game (racing game) in which a plurality of game objects move along a course set in a virtual space, is performed. The first game is a game in which a plurality of game objects start moving from a starting point on the course, make multiple laps around the course in order to reach the goal, and compete for a ranking at which the game object reaches the goal. In addition, in the exemplary embodiment, for example, a second game in which a plurality of game objects battle while moving on a course or field in a virtual space, is performed. In the following, when the first game and the second game are not particularly distinguished, the first game and the second game are simply referred to as "game".

First Game

Figure 3:
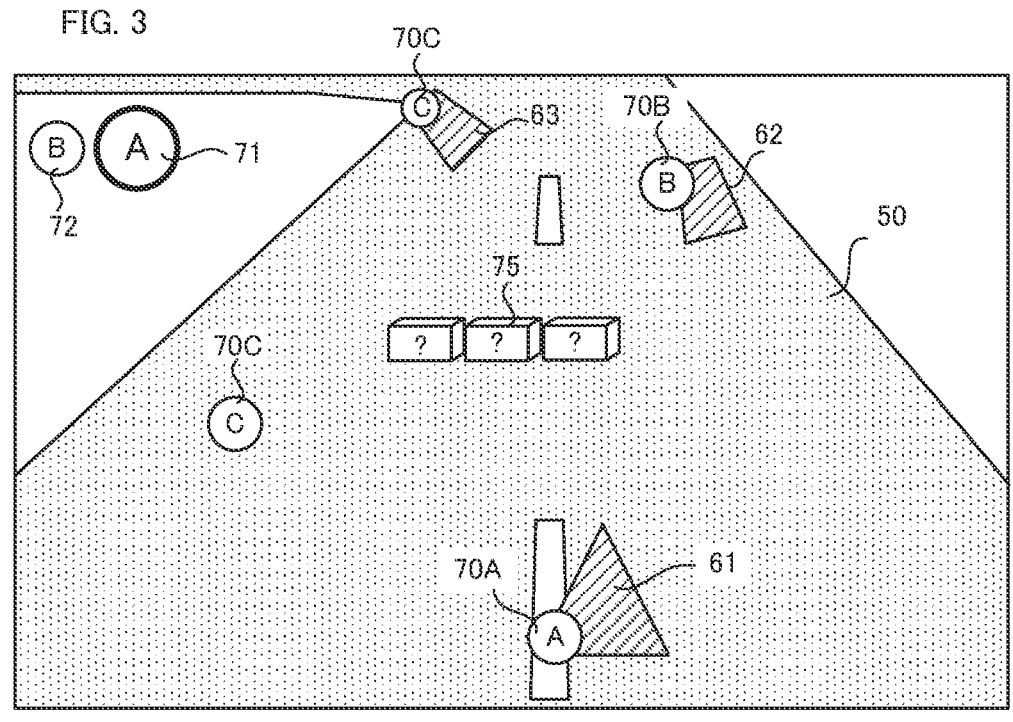
FIG. 3 is a diagram showing an example of a game image displayed during a first game of an exemplary embodiment.

FIG. 3 is a diagram showing an example of a game image displayed during the first game of the exemplary embodiment. As shown in FIG. 3, in the first game, a course 50 is set in a virtual space. In addition, a plurality of game objects (61 to 63) are placed in the virtual space. In the first game, the plurality of game objects 61 to 63 move along the course 50 in order to reach the goal. In addition to the three game objects 61 to 63 shown in FIG. 3, a plurality of game objects may be placed in the virtual space.

The game object 61 is operated by a first player using controllers (3 and 4) connected to the main body apparatus 2. In the following, the game object 61 operated by the first player of the main body apparatus 2 among the plurality of game objects is referred to as "player object 61".

The game (first and second games) of the exemplary embodiment can be performed in a multiplayer mode in which a plurality of players participate, or in a single-player mode in which the game is performed by a single player. In addition, in the multiplayer mode, the game can be performed by a plurality of players by connecting a plurality of controllers to one main body apparatus 2, or the game can be performed by a plurality of players by connecting a plurality of main body apparatuses 2 to a network (a LAN, the Internet, or the like) and using the plurality of main body apparatuses 2.

When the game is performed in the single-player mode, the player object 61 is controlled by the first player, and the game objects 62 and 63 are automatically controlled by the main body apparatus 2.

When the game is performed in the multiplayer mode, the player object 61 is controlled by the first player, and the game object 62 is operated by a second player. In addition, when the game is performed in the multiplayer mode, the game object 63 may be operated by a third player, or may be automatically controlled by the main body apparatus 2. In addition to the three game objects 61 to 63 shown in FIG. 3, a plurality of game objects each controlled by another player or the main body apparatus 2 may be placed in the virtual space.

The game (first and second games) of the exemplary embodiment has an individual competition in which each game object competes and a team competition in which a plurality of game objects are divided into two or more teams and compete against each other between the teams. It is possible to execute the game in an individual competition and a team competition in each of the single-player mode and the multiplayer mode.

In the game of the exemplary embodiment, a plurality of items 70 can appear in the virtual space. Each item 70 is an object that causes an effect in the game. There are multiple types of items 70 that cause different effects. For example, the items 70 include an item 70A, an item 70B, and an item 70C. The item 70A is an item that attacks other game objects. In addition, the item 70B is an item that attacks other game objects and that has weaker attack power than the item 70A. In addition, the item 70C is an item that is placed on the course 50 and that interferes with running of other game objects. In addition, a plurality of items that have disadvantageous effects on other game objects in the game are prepared. Moreover, in addition to the items that have disadvantageous effects, items each of which has an advantageous effect on a game object itself that uses the item are prepared. For example, an item that temporarily increases the speed of a game object itself that uses the item may be prepared, or an item that temporarily nullifies or reduces attacks from other game objects may be prepared.

As shown in FIG. 3, the item 70A is placed in the vicinity of the player object 61. The item 70A in the vicinity of the player object 61 is possessed and equipped by the player object 61. In addition, a main item 71 indicating the item 70A possessed and equipped by the player object 61 is displayed in the upper left corner of the game image. A sub-item 72 is displayed on the left side of the main item 71.

The sub-item 72 is an item that is possessed by the player object 61 and that is in a ready state. When the player object 61 is equipped with the item 70A, if the player performs a predetermined operation using the controller, the item 70A is used. After the item 70A is used, the sub-item 72 becomes the main item 71 and is equipped by the player object 61. In addition, the game object 62 possesses and is equipped with the item 70B. In addition, the game object 63 possesses and is equipped with the item 70C. The game object 62 and/or 63 may possess a sub-item 72. In addition, the item 70C is placed on the course 50.

Each game object progresses the racing game while using the items 70. For example, the player object 61 uses the equipped item 70A by discharging the item 70A forward in response to an operation by the player. When the discharged item 70A hits, for example, the game object 62, an attack is made on the game object 62. When the item 70A hits the game object 62, the game object 62 temporarily stops or the speed of the game object 62 is temporarily decreased. In addition, the game object 63 uses the equipped item 70C by placing the item 70C on the course 50. For example, when the player object 61 hits the item 70C (passes over the item 70C), the player object 61 slips and temporarily goes off course. When the player object 61 hits the item 70C, the player object 61 may stop or the speed of the player object 61 may be decreased.

As shown in FIG. 3, item boxes 75 are placed on the course 50. The item boxes 75 are placed at multiple locations on the course 50. Each item box 75 is an object for giving an item 70 to a game object. When a game object hits an item box 75 (a predetermined condition is satisfied), item random selection for giving any item from among the multiple types of items 70 is performed. The item 70 given through the item random selection is possessed by the game object.

Figure 4:
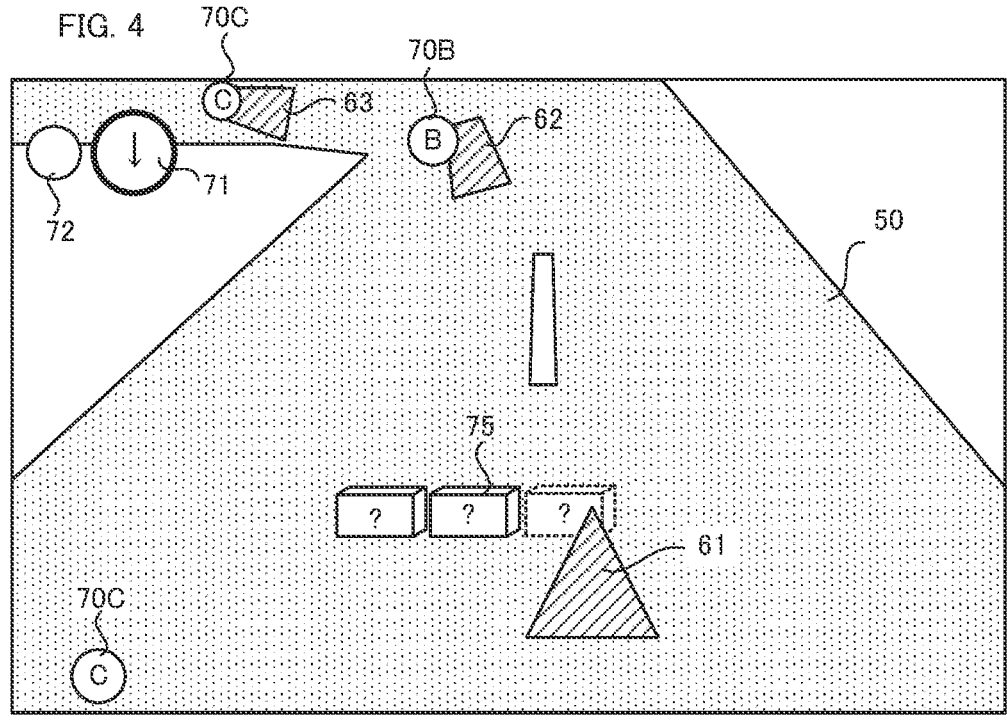
FIG. 4 is an example non-limiting diagram showing an example of a game image when a player object 61 hits an item box 75.

FIG. 4 is a diagram showing an example of a game image when the player object 61 hits an item box 75. As shown in FIG. 4, when the player object 61 hits the item box 75, for example, a plurality of items 70 are variably displayed in an upper left region of the game image. When any one of the plurality of items 70 stops, the stopped item 70 is given to the player object 61. When the item 70 is given to the player object 61, if the player object 61 is not currently equipped with any item 70, this item 70 is displayed in the vicinity of the player object 61, and the player object 61 becomes equipped with this item. As described above, each game object progresses the game while hitting an item box 75 placed in the virtual space, acquiring an item 70, and using the acquired item 70.

In the game of the exemplary embodiment, when a game object hits an item box 75, item random selection is performed using a pre-stored situation table corresponding to a game situation. In the situation table, a degree of ease of appearing (degree of ease of being given) is set in advance for each item. The "degree of ease of appearing" is a parameter for calculating a probability of appearing for the item as described later. In the situation table, a "probability of appearing" may be set for each item as the "degree of ease of appearing (degree of ease of being given)".

The game situation is a situation defined by parameters that affect a result of the game. For example, a game situation in the first game is the ranking of each game object. In the first game, when a game object hits an item box 75, item random selection is performed using a situation table corresponding to the ranking of the game object when the game object hits the item box 75.

Instead of (or in addition to) the ranking of the game object, the game situation in the first game may be a value calculated based on information on how many laps the game object is currently running, the elapsed time from the start of the first game, the distance from the starting point, the distance to the goal, the distance and the time difference from the first-ranking game object, the distance and the time difference from the game object ranked higher by one than the own ranking, the distance and the time difference from the following game object, the score and the physical strength value of the game object, etc. In addition, the game situation in the first game may be defined by a result of predetermined calculation using these parameters.

For example, different tables may be prepared depending on how many laps the game object is currently running (number of laps), and information of the "number of laps" may be used in addition to the "ranking" as the game situation. In this case, the degree of ease of appearing for each item may be obtained from a table corresponding to the "ranking", the degree of ease of appearing for each item may also be obtained from a table corresponding to the "number of laps", and the degree of ease of appearing for each item may be determined by multiplying or adding the degrees of ease of appearing calculated from the respective tables. A probability of appearing for each item may be determined based on the degree of ease of appearing for each item determined as described above.

FIG. 5 is a diagram showing an example of a situation table for the first game. Data indicating the situation table shown in FIG. 5 is stored in advance in the memory (an internal storage medium such as the DRAM 27 or the flash memory 26, or an external storage medium attached to the slot 29) of the main body apparatus 2.

As shown in FIG. 5, in the pre-stored situation table (an example of first data), a degree of ease of appearing is set for each of a plurality of item 70 (70A to 70L). Specifically, a degree of ease of appearing is set for each of the plurality of items 70 in correspondence with to the ranking of a game object when the game object hits an item box 75. In the situation table for the first game, the degree of ease of appearing for each item is set for each ranking such that a total of the 12 items 70A to 70L can appear during the first game. For example, when a game object hits an item box 75, if the ranking of the game object is ranked first, random selection is performed using a situation table for "first" ranking. In the situation table for "first" ranking, the degree of ease of appearing for the item 70A is set to "0" in advance. Also, in the situation table for "first" ranking, the degrees of ease of appearing for the item 70B, the item 70C, the item 70D, and the item 70E are set to "0", "0.5", "0.5", and "1", respectively. A degree of ease of appearing is also set in advance for each of other items. The degree of ease of appearing for each item indicates the height of the probability of appearing (probability of being given) for each item. Specifically, a value obtained by dividing the degree of ease of appearing for an item by the total of the degrees of ease of appearing for all the items is the probability of appearing for the item. Therefore, for example, when the game object that is currently ranked first hits an item box 75, the item 70A cannot be given, and the item 70C can be given with a probability of "0.5/8". Here, it is assumed that the total of the degrees of ease of appearing for the respective items in the situation table corresponding to the first ranking is "8". In FIG. 5, for description, the "probability of appearing" for each item is displayed, but the "probability of appearing" is calculated based on the "degree of ease of appearing", and the "probability of appearing" itself is not included in the table.

When the game object that is currently ranked second hits an item box 75, random selection is performed using a situation table for "second" ranking. In the situation table for "second" ranking, the degrees of ease of appearing for the item 70A, the item 70B, the item 70C, the item 70D, and the item 70E are set to "0", "1", "1", "1.5", and "2", respectively.

When the game object that is currently ranked eighth hits an item box 75, random selection is performed using a situation table for "eighth" ranking. In the situation table for "eighth" ranking, the degrees of ease of appearing for the item 70A, the item 70B, the item 70C, the item 70D, and the item 70E are set to "2", "2", "1", "1", and "3", respectively.

In the exemplary embodiment, in the situation table, a degree of ease of appearing is set in advance for each item by a game creator such that an item having a relatively low advantage degree is more likely to be given to a game object that is currently ranked relatively high, and an item having a relatively high advantage degree is more likely to be given to a game object that is currently ranked relatively low. Accordingly, the rankings are more likely to change among the plurality of game objects during a race.

For example, as shown in FIG. 5, the higher the current ranking is, the lower the degree of ease of appearing for the item 70A is. Specifically, when the current ranking is the first or second ranking, the degree of ease of appearing for the item 70A is set to "0" such that the item 70A does not appear. The item 70A is an item having a high advantage degree for a game object that uses the item 70A, and is, for example, an item having the highest attack power. For example, if the item 70A having the highest advantage degree is given to the game object ranked first, the game object ranked first may have an advantage over the other game objects, and the gaps with the other game objects may become wider. Therefore, the item 70A having the highest advantage degree is set such that the item 70A is not given or is difficult to be given to a game object ranked high. On the other hand, the probability of appearing for the item 70A having the highest advantage degree is set so as to be higher for a game object ranked lower than for a game object ranked higher.

As for each item type, a plurality of items can appear during the game, and an upper limit number of items that can exist simultaneously during the game is predetermined for each item type. For example, the upper limit number for the item 70A is set to "2", the upper limit number for the item 70B is set to "5", and the upper limit number for the item 70C is set to "10". When a game object hits an item box 75, item random selection is performed using the above situation table, except for each item that has reached the upper limit number. Specifically, when a game object hits an item box 75, the number of all items existing in the virtual space is calculated for each item type, the degree of ease of appearing for each item that has reached the upper limit number is set to "0". In the situation table corresponding to the game situation, the degree of ease of appearing for each item that has reached the upper limit number is set to "0", and random selection is performed using this table.

The "items existing in the virtual space" include items placed on the course 50 (items 70C in FIG. 3) and items possessed and equipped by the respective game objects (items 70A, 70B, and 70C displayed in the vicinity of the respective game objects). In addition to the items placed on the course 50 and the items equipped by the respective game objects, the "items existing in the virtual space" may include items that possessed by the respective game objects and that are in a ready state (sub-item 72). Moreover, the "items existing in the virtual space" may mean only items placed on the course 50.

Setting of Appearable Items

The game of the exemplary embodiment is configured to allow the player to set an item that can be given to a game object when the game object hits an item box 75, from an item group including a plurality of items 70. For example, an item setting screen is activated by selection by the player before the game starts. On the item setting screen, the player can set an item that can be given to a game object when the game object hits an item box 75.

FIG. 6 is a diagram showing an example of the item setting screen. As shown in FIG. 6, a plurality of items 70 (e.g., the 12 items 70A to 70L) are displayed on the item setting screen. The player can select the desired item (set the desired item to ON), for example, by moving a cursor 80 using the analog stick 6 of the controller 3 and pressing the button 5 of the controller 4. All the items 70 may be set to ON by default, and by the player moving the cursor 80 to the desired position and pressing the button 5, the item 70 indicated by the cursor 80 may be set to OFF. Alternatively, all the items 70 may be set to OFF by default, and by the player moving the cursor 80 to the desired position and pressing the button 5, the item 70 indicated by the cursor 80 may be set to ON. As described above, each item 70 is set to ON or OFF by selection by the player on the item setting screen.

FIG. 7 is a diagram showing how items are randomly set on the item setting screen. When a "Random" button 81 displayed on the item setting screen is indicated by the cursor 80, if the button 5 is pressed, one or more items 70 are randomly set to ON from among the 12 items 70. Each time the button 5 is pressed, the items 70 set to ON are switched.

In addition, a button for setting all the items to ON (or OFF) may be displayed on the item setting screen, and all the items may be set to ON (or OFF) if the button 5 of the controller is pressed when this button is indicated by the cursor 80.

After one or more items 70 are set to ON randomly or by selection by the player, if an OK button 82 is indicated using the cursor 80 and the button 5 is pressed, each item 70 set to ON is set as an "appearable item". The items that are not set as appearable items (i.e., items that are set to OFF when the OK button 82 is pressed) are referred to as "non-appearable items". For each item, information indicating whether the item is set as an appearable item or a non-appearable item is stored as "customization data".

As described above, on the item setting screen, appearable items are set from the item group including the plurality of items 70 (items 70A to 70L), randomly or based on selection by the player.

In the above, the player selects an individual item 70 and sets the selected item 70 as an appearable item, but the method for setting an appearable item based on selection by the player is not limited thereto. For example, a plurality of item sets (e.g., IS1 to IS5) may be prepared in advance by the game creator, any of the plurality of item sets IS1 to IS5 may be selected by the player, and one or more items 70 included in the selected item set may be set as appearable items. Alternatively, the plurality of item sets IS1 to IS5 may be switched sequentially according to an operation by the player, any of the plurality of item sets IS1 to IS5 may be selected by an operation by the player, and one or more items 70 included in the selected item set may be set as appearable items. That is, setting an appearable item based on "selection by the player" includes the case where the player individually selects an item and sets the item as an appearable item and the case where the player selects an item set and sets an item in the item set as an appearable item.

After appearable items (or non-appearable items) are set on the item setting screen, the game is started. Hereinafter, the mode of the game executed after the item setting screen is activated by selection by the player is referred to as "customization mode". On the other hand, if the game is started without the item setting screen being activated by selection by the player, the game is performed in an "item-fixed mode". Normally, the game is executed in the "item-fixed mode". That is, if the player selects the customization mode before the game starts, the item setting screen is activated, and the game is executed in the "customization mode", and if this selection is not performed, the item setting screen is not activated, and the game is executed in the "item-fixed mode". Even if the player selects the customization mode and the item setting screen is activated, for example, if the player exits the item setting screen without setting ON/OFF of each item on the item setting screen (with the default setting), or if the player sets all the items to ON and exits the item setting screen, the game may be performed in the item-fixed mode (the same game processing as usual may be performed).

When the first game is executed in the customization mode, for example, if the player object 61 hits an item box 75, item random selection is performed based on a corrected table obtained by correcting a pre-stored situation table. For example, when the player object 61 hits an item box 75, if the player object 61 is ranked eighth, item random selection is performed based on a corrected table obtained by a pre-stored situation table for eighth ranking.

FIG. 8 is a diagram showing an example of the pre-stored situation table for eighth ranking. FIG. 9 is a diagram showing an example of the corrected table obtained by correcting the pre-stored situation table for eighth ranking.

As shown in FIG. 8, in the pre-stored situation table for eighth ranking, for example, the degrees of ease of appearing for the items 70A and 70B are set to "2", the degrees of ease of appearing for the items 70C and 70D are set to "1", the degree of ease of appearing for the item 70E is set to "3", the degrees of ease of appearing for the items 70F and 70G are set to "1", and the degrees of ease of appearing for the items 70H and 70I are set to "0.5". In addition, the degrees of ease of appearing for the items 70J to 70L are set to "0". In the item-fixed mode, item random selection is performed using the pre-stored situation table shown in FIG. 8.

Meanwhile, when any appearable item is set on the item setting screen (when the game is executed in the customization mode) as well, the situation table shown in FIG. 8 is used. In this situation table, the degree of ease of appearing for each appearable item is maintained, and the degree of ease of appearing for each non-appearable item is set to "0". The table set thus is stored as a corrected table. Therefore, in the corrected table, the degree of ease of appearing for each appearable item is the same as the degree of ease of appearing for this item in the situation table. That is, the degree of ease of appearing for each appearable item is set based on the pre-stored situation table corresponding to the game situation.

For example, as shown in FIG. 9, the degrees of ease of appearing for the items 70F to 70L which are set as appearable items are set to "1", "1", "0.5", "0.5", "0", "0", and "0", respectively, as in the situation table shown in FIG. 8. The degrees of ease of appearing for the items 70B to 70E which are set as non-appearable items are set to "0". Even for items that are set as appearable items, the degree of ease of appearing is set to "0" for each item that has reached the upper limit number at this time. For example, as shown in FIG. 9, even when the item 70A is set as an appearable item, if the number of items 70A existing in the virtual space when the player object 61 hits an item box 75 has reached the upper limit number, the degree of ease of appearing for the item 70A is set to "0".

In the customization mode, the upper limit number for each item does not have to be fixed. Specifically, in the customization mode, the upper limit number for each item may be set to be smaller when the number of set appearable items (the number of types of items that are set to ON) is larger. The upper limit number for each item in the item-fixed mode and the upper limit number for each item in the customization mode may be different. That is, the upper limit number for the same item may differ between the item-fixed mode and the customization mode.

Item random selection is performed using the corrected table generated thus. For example, in the example shown in FIG. 9, each of the probabilities of appearing (probability of being given) for the items 70F and 70G is set to 1/3, and each of the probabilities of appearing for the items 70H and 70I is set to 0.5/3.

As described above, when the first game is performed in the customization mode, any item is given to the player object 61 from among the appearable items based on the situation table corresponding to the ranking of the player object 61 when the player object 61 hits an item box 75. Similarly, when the game object 62 or 63 other than the player object 61 hits an item box 75, any item is given to this game object from among the appearable items based on the situation table corresponding to the ranking of this game object.

Item Random Selection Using Equal Probability Table

Here, when the game is performed in the customization mode, there may be a case where any item cannot be given from among the appearable items by item random selection using the above corrected table. FIG. 10 is a diagram showing an example of a corrected table when any item cannot be given from among the appearable items.

As shown in FIG. 10, for example, when the items 70B to 70I are set as non-appearable items, the degrees of ease of appearing for the items 70B to 70I are set to "0". In addition, if the number of items 70A existing in the virtual space when a game object hits an item box 75 has reached the upper limit number, the degree of ease of appearing for the item 70A is set to "0". The items 70J to 70L are set as appearable items, but the degrees of ease of appearing for the items 70J to 70L are set to "0" in the pre-stored situation table for eighth ranking. Therefore, in the corrected table shown in FIG. 10, the degrees of ease of appearing for all the items 70 are "0", and any item cannot be given from among the appearable items using this corrected table. That is, any item cannot be given from among the appearable items based on the situation table corresponding to the game situation.

In such a case, item random selection is performed using a table different from the situation table corresponding to the game situation. Specifically, item random selection is performed using an equal probability table (example of second data) in which the degree of ease of appearing for each item is set to be the same.

FIG. 11 is a diagram showing an example of the equal probability table. In item random selection using the equal probability table as well, any item that has reached the upper limit number and any non-appearable item set on the item setting screen are not determined as items to be given.

Specifically, as shown in FIG. 11, in the equal probability table, the degrees of ease of appearing for the appearable items are all set to "1". Also, in the equal probability table, the degrees of ease of appearing for the non-appearable items are set to "0", and the degree of ease of appearing for each item that has reached the upper limit number when a game object hits an item box 75 is set to "0". By performing random selection using such an equal probability table, an item to be given is determined from among the appearable items.

The equal probability table shown in FIG. 11 is generated based on the pre-stored table and the customization data. For example, when item random selection is executed, an equal probability table, in which the degree of ease of appearing for each appearable item is set to "1" and the degree of ease of appearing for each non-appearable item and each item that has reached the upper limit number is set to "0", is generated. A basic equal probability table in which the degrees of ease of appearing for all the items are set to "1" may be stored in advance, and in the pre-stored basic equal probability table, the degree of ease of appearing for each non-appearable item and each item that has reached the upper limit number may be corrected to "0".

As described above, in the exemplary embodiment, in the customization mode, first, an attempt to give any item from among the appearable items based on the corrected table (table in which the degree of ease of appearing stored in the situation table is set for each appearable item) based on the pre-stored situation table is first made. If any item cannot be given, any item is given from among the appearable items based on the equal probability table. In the situation table, the probability of appearing for each item is adjusted in advance according to the current ranking, and even if any appearable item is set by the player, an appropriate item can be given according to the game situation using the situation table. If any item cannot be given based on the corrected table, an item to be given is determined from among the appearable items using the equal probability table. Therefore, an item can be prevented from not appearing even though this item is set as an appearable item. For example, if the item 70A is set in advance in the situation table such that the item 70A is not given to the game object ranked first, but only the item 70A is set as an appearable item, the item 70A can be given based on the equal probability table. Accordingly, an item can be given so as to reflect the setting by the user. For example, when the item 70A and the item 70B are set in advance in the situation table such that the item 70A is not given but the item 70B is given to a game object in a specific game situation (ranking), if the item 70A and the item 70B are set as appearable items, the item 70B is given to the game object in the specific game situation by random selection based on the corrected table (the item 70A cannot be given). This agrees with the original idea of the situation table that the item 70A is not given but the item 70B is given to a game object in a specific game situation (ranking).

Even when the equal probability table shown in FIG. 11 is used, there may be a case where any item cannot be given from among the appearable items.

Specifically, if the number for each item set as an appearable item has reached the upper limit number when a game object hits an item box 75, the degrees of ease of appearing for all the items become "0". For example, in FIG. 11, if only the item 70A is set as an appearable item, since the item 70A has reached the upper limit number when a game object hits an item box 75, the degrees of ease of appearing for all the items become "0". Alternatively, if all the items are set as non-appearable items on the item setting screen, the degrees of ease of appearing for all the items become "0".

In such cases, an item to be given is determined using an exception table. FIG. 12 is a diagram showing an example of the exception table. As shown in FIG. 12, in the exception table, for example, the degrees of ease of appearing for the items 70A to 70D and 70H to 70L are set to "0" in advance. In addition, the degrees of ease of appearing for the items 70E to 70G are set to "3", "2", and "1", respectively. When item random selection is performed using the exception table, any item is given from among the items 70E to 70G which are predetermined, regardless of whether the items 70E to 70G are set as appearable items. When item random selection is performed using the exception table as well, any item that has reached the upper limit number is not given. However, the upper limit number for each of the items 70E to 70G is a relatively large value, and thus any of the items 70E to 70G is determined as an item to be given.

In the exception table, the same probability of appearing may be set in advance for the items 70E to 70G.

As described above, when the first game is executed in the item-fixed mode, any item is determined as an item to be given from among the plurality of items 70 based on the situation table corresponding to the ranking of a game object when the game object hits an item box 75. Accordingly, an item can be given to the game object in correspondence with the game situation.

Meanwhile, when the first game is executed in the customization mode, any item is determined as an item to be given from among appearable items set on the item setting screen, based on the situation table corresponding to the ranking (corrected table based on the situation table). Accordingly, any item can be given to the game object from among the appearable items set on the item setting screen, in correspondence with the game situation.

When the first game is executed in the customization mode, if any item cannot be given from among the appearable items based on the corrected table, any item can be given from among the appearable items using the equal probability table. Furthermore, if any item cannot be given from among the appearable items even when the equal probability table is used, any item is given from among a plurality of items using the exception table, regardless of whether any appearable item or non-appearable item is set on the item setting screen. Accordingly, even if any item is set as an appearable item on the item setting screen, any item can be given to the game object from among the plurality of items.

The item-fixed mode may include a first fixed mode in which any item is given from a first item group including a plurality of items, a second fixed mode in which any item is given from a second item group different from the first item group, and a third fixed mode in which any item is given from among all items. For each of the first fixed mode, the second fixed mode, and the third fixed mode, a situation table in which a degree of ease of appearing is set in advance for each item according to a game situation is prepared. The player selects the first fixed mode, the second fixed mode, or the third fixed mode, or selects the customization mode, before executing the game, and then starts the game. Normally (when the player does not select any mode), the game is started in the third fixed mode. When the game is performed in the third fixed mode, the situation table shown in FIG. 5 is used. The situation table used in the third fixed mode is also used in the customization mode. That is, in the customization mode, the degree of ease of appearing for each appearable item is set based on the situation table used in the third fixed mode in which any item is given from among all items. The first to third fixed modes are also executed by selection by the player, but by selecting the first to third fixed modes, the item setting screen shown in FIG. 6 is not activated, and the player cannot set individual items as appearable items on the item setting screen, or cannot set randomly selected items as appearable items. That is, in the first to third fixed modes, items that can be given through item random selection are fixed.

On the other hand, in the customization mode, the player can set one or more desired items as appearable items on the item setting screen. In the customization mode, items that can be given through item random selection are not fixed items but are items set by the player.

When the game is performed in the multiplayer mode using a plurality of main body apparatuses 2, customization data that is set on the item setting screen in one main body apparatus 2 is shared by the other main body apparatuses 2, and item random selection is also performed based on the same customization data in the other main body apparatuses 2.

When the game is performed in an individual competition or performed in a team competition, the player can set any appearable item or non-appearable item on the item setting screen. When the game is performed in a team competition, any appearable item or non-appearable item are set for each team.

For example, it is assumed that a first player belongs to a first team, a second player belongs to a second team, and a team competition is performed between the first team and the second team. In this case, among one or more players belonging to the first team, the first player activates the item setting screen, and sets any appearable item or non-appearable item, and first customization data corresponding to the setting of the items is stored. In addition, the second player sets any appearable item or non-appearable item on the item setting screen, and second customization data is stored. In this case, when a game object belonging to the first team hits an item box 75, an item to be given is determined from among the appearable items set by the first player, based on the first customization data described above. When a game object belonging to the second team hits an item box 75, an item to be given is determined from among the appearable items set by the second player, based on the second customization data.

Item customization may be performed on the item setting screen for the first team, but item customization may not necessarily be performed for the second team. In this case, when a game object belonging to the first team hits an item box 75, an item to be given is determined from among the appearable items based on the first customization data. Meanwhile, when a game object belonging to the second team hits an item box 75, any item may be determined as an item to be given from among the plurality of items 70A to 70L based on the situation table shown in FIG. 5.

Second Game

Next, the second game will be described. The second game is a game in which a plurality of game objects battle while moving on a course or field in a virtual space. In the second game, a physical strength value (life value) is initially set for each game object. In the second game, a game situation is defined based on the physical strength value of each game object. For example, each game object attacks an opponent game object using an item, thereby decreasing the physical strength value of the opponent game object. When the game object decreases the physical strength value of the opponent game object by attacking using an item, points are added to the game object that has made the attack. On the other hand, when the game object decreases its physical strength value by an attack from the opponent game object, the points of the game object that has received the attack are decreased. A win or a loss is determined based on the number of points of each game object at the time when a predetermined time elapses from the start of the second game. The second game can be executed both in an individual competition and in a team competition.

In the second game as well, item boxes 75 are placed in the virtual space. When a game object hits an item box 75, item random selection is performed according to the game situation. The game situation in the second game is defined based on the ranking of the current number of points.

Instead of (or in addition to) the ranking of the current number of points, the game situation in the second game may be a value calculated based on the difference in the number of points from the first ranking, the elapsed time from the start of the game, the remaining physical strength value of the game object, the number of attacks made, the number of attacks received, etc. In addition, the game situation in the second game may be defined by a result of predetermined calculation using these parameters.

The second game can also be executed in an item-fixed mode or a customization mode. Normally, the second game is performed in the item-fixed mode. In the item-fixed mode, item random selection is performed using a pre-stored situation table for the second game corresponding to the game situation.

Specifically, the second game has a plurality of modes including mode A and mode B as item-fixed modes. For example, the player sets any mode among the plurality of item-fixed modes before the second game starts. The type of items to be given when a game object hits an item box 75 differs between mode A and mode B. For example, mode A may be a mode in which aggressive items are more likely to be given than in mode B.

FIG. 13 is a diagram showing an example of a pre-stored situation table used when the second game is executed in mode A. FIG. 14 is a diagram showing an example of a pre-stored situation table used when the second game is executed in mode B. Data indicating the situation tables shown in FIG. 13 and FIG. 14 is stored in advance in the memory (an internal storage medium such as the DRAM 27 or the flash memory 26, or an external storage medium attached to the slot 29) of the main body apparatus 2.

As shown in FIG. 13, in mode A, the degree of ease of appearing is set in advance for each item in the situation table such that any of the items 70A to 70F is selected in correspondence with the game situation. For example, in the situation table for the eighth-ranking number of points, the degrees of ease of appearing for the items 70A to 70F are set to "3", "2", "1", "1.5", "1.5", and "1", respectively. The degree of ease of appearing is set to "0" for the items 70G to 70L. Therefore, when the number of points of a game object is ranked eighth when the game object hits an item box 75, the items 70A to 70F are determined as items to be given with probabilities of "3/10", "2/10", "1/10", "1.5/10", "1.5/10", and "1/10", respectively. Here, the game situation in which the number of points of the game object is ranked eighth is shown as an example, but in mode A, in any game situation, the items 70G to 70L cannot be determined as items to be given.

As shown in FIG. 14, in mode B, any of the items 70G to 70L is selected in correspondence with the game situation. In mode B, in any game situation, the items 70A to 70F cannot be determined as items to be given.

Thus, when the second game is executed in the item-fixed mode, the items 70G to 70L do not appear in mode A, and the items 70A to 70F do not appear in mode B. Therefore, in the second game, there is no mode (situation table) in which all the items can appear. When the second game is executed in the customization mode, it is conceivable to use situation tables prepared for the item-fixed mode, but even when any of the tables is used, there are missing items, and a situation table in which all the items can appear is not prepared. Therefore, in the exemplary embodiment, when the second game is executed in the customization mode, the pre-stored situation table used in the item-fixed mode is used, and addition is made to the degrees of ease of appearing for appearable items in this situation table. Hereinafter, an example in which the second game is executed in the customization mode using the situation table for mode A will be described.

FIG. 15 is a diagram showing an example of an addition table in which addition is made to the degree of ease of appearing for each appearable item. FIG. 15 shows how addition is made to the degree of ease of appearing for each appearable item with the situation table corresponding to the "eighth-ranking" number of points for mode A as an example.

As shown in FIG. 15, first, the degrees of ease of appearing set in the situation table in FIG. 13 is set as the degrees of ease of appearing for the items 70A to 70C, 70K, and 70L which are set as appearable items. Accordingly, the degrees of ease of appearing stored in advance according to the game situation are set as values, before addition, of the degrees of ease of appearing for these items 70A to 70C, 70K, and 70L.

Furthermore, addition is made to the degrees of ease of appearing for the items 70A to 70C, 70K, and 70L which are set as appearable items. Specifically, the minimum degree of ease of appearing that is larger than "0" is calculated from the degrees of ease of appearing for the respective appearable items, and is added to the degrees of ease of appearing for the respective appearable items. In the example in FIG. 15, the item having the minimum degree of ease of appearing that is larger than "0", among the items 70A to 70C, 70K, and 70L which are set as appearable items, is the item 70C, and the degree of ease of appearing set for the item 70C is "1". Therefore, the minimum value "1" is added to the values of the degrees of ease of appearing for the items 70A to 70C, 70K, and 70L which are set as appearable items. Therefore, the degrees of ease of appearing for the items 70A to 70C, 70K, and 70L after the addition are "4", "3", "2", "1", and "1", respectively.

The degrees of ease of appearing for the items 70D to 70J which are set as non-appearable items are set to "0". In addition, the degree of ease of appearing is set to "0" for each item that has reached the upper limit number when a game object hits an item box 75. The minimum value is not added for the non-appearable items and any item that has reached the upper limit number.

When a game object hits an item box 75, item random selection is performed using the addition table shown in FIG. 15, and an item determined through the item random selection is given to the game object.

As described above, in the second game, addition is made to the degree of ease of appearing for each appearable item for which the degree of ease of appearing is set to "0" in advance. In addition, addition is also made to the degree of ease of appearing for each appearable item for which the degree of ease of appearing is set to a value larger than "0" in advance.

As in the first game, when the second game is performed in the customization mode, there may be a case where any item cannot be given from among the appearable items by item random selection using the above addition table. FIG. 16 is a diagram showing an example of an addition table when any item cannot be given from among the appearable items in the second game.

For example, if the items 70B to 70J are set as non-appearable items, "0" is set as the degrees of ease of appearing for the items 70B to 70J as shown in FIG. 16. In addition, if the number of items 70A existing in the virtual space has reached the upper limit number when a game object hits an item box 75, the degree of ease of appearing for the item 70A is set to "0". As a result, the degrees of ease of appearing for all the items become "0", and any item cannot be given from among the appearable items.

In such a case, as in the first game, item random selection is performed using an equal probability table. Specifically, as in the first game, in the item random selection, an equal probability table, in which the degrees of ease of appearing for the appearable items are all set to "1", and the degrees of ease of appearing for each non-appearable item and each item that has reached the upper limit number are set to "0", is used.

If any item cannot be given from among the appearable items even when the equal probability table is used, an item to be given is determined using an exception table, as in the first game.

As described above, in the second game, items that cannot be given in the item-fixed mode can be given in the customization mode.

By making addition to the degrees of ease of appearing for all the appearable items set on the item setting screen, the probability of appearing for only a specific item can be prevented from being increased, thereby maintaining the balance of the game. For example, when the degree of ease of appearing for only an item for which the degree of ease of appearing is set to "0" in advance, among the appearable items, is increased, the probability of appearing for the item that originally cannot appear may become relatively high, which may be undesirable for the balance of the game. For example, if the degree of ease of appearing for the item 70A is set to "0" in advance and the degree of ease of appearing for the item 70B is set to "1" in advance in the situation table corresponding to a specific game situation, the item 70A does not appear normally (in the item-fixed mode). In this case, when a plurality of items including the items 70A and 70B are set as appearable items, for example, if "1" is added to only the degree of ease of appearing for the item 70A, the item 70A that normally cannot be given is given with the same probability of appearing as that of the item 70B, which may be undesirable for the balance of the game. In the exemplary embodiment, since addition is made to the degrees of ease of appearing for all appearable items that have not reached the upper limit, the appearable items can be given while the balance of the game is maintained.

In the exemplary embodiment, since the minimum degree of ease of appearing among the degrees of ease of appearing for a plurality of appearable items is added, the probability of appearing for each appearable item can be increased without deviating significantly from the pre-stored situation table. That is, in the pre-stored situation table, the degree of ease of appearing for each item is set in advance in correspondence with the game situation. For example, the situation table is set such that an item having a relatively low advantage degree (e.g., an item having weak attack power) is more likely to be given to a game object that currently has an advantage, and an item having a relatively high advantage degree (e.g., an item having strong attack power) is more likely to be given to a game object that currently has a disadvantage. Accordingly, for example, it is made easier to change the game situation (specifically, the ranking of the number of points) for each game object until the second game ends. As for the situation table set as described above, if the degree of ease of appearing for each appearable item is greatly increased, the fun factor of the game intended by the game creator may be impaired. In the exemplary embodiment, as for the pre-stored situation table, since the minimum degree of ease of appearing is added for each appearable item, the probability of appearing for each appearable item can be increased without impairing the fun factor of the game.

In the exemplary embodiment, the minimum degree of ease of appearing is added for each appearable item. However, in another exemplary embodiment, instead of adding the minimum value, a value based on the minimum value (e.g., ½ of the minimum value) may be added. Alternatively, instead of the minimum value, a fixed value may be added for each appearable item. Moreover, in the exemplary embodiment, the degrees of ease of appearing for all the appearable items except for each item that has reached the upper limit are increased. However, in another exemplary embodiment, the degree of ease of appearing for only each appearable item for which the degree of ease of appearing are set to "0" in advance may be increased.

The items that can be given may differ between the first game and the second game. For example, there may be an item X that can be given in the first game but cannot be given in the second game. Such an item X may be displayed (can be set to ON or OFF) on the item setting screen for the first game but may not displayed (cannot be set to ON or OFF) on the item setting screen for the second game. Conversely, there may be an item Y that cannot be given in the first game but can be given in the second game. Such an item Y may not be displayed (cannot be set to ON or OFF) on the item setting screen for the first game, but may be displayed (can be set to ON or OFF) on the item setting screen for the second game.

Details of Game Processing

Next, the details of the game processing performed in the game system 1 will be described. First, various kinds of data stored in the memory (the DRAM 27, the flash memory 26, or an external storage medium attached to the slot 29) of the game system 1 will be described. FIG. 17 is a diagram showing an example of various kinds of data stored in the memory of the game system 1.

As shown in FIG. 17, a game program, operation data, game object data, item placement data, customization data, a situation table, a corrected table, an addition table, an equal probability table, and an exception table are stored in the memory.

The game program is a program for executing the game processing described later. The game program includes a program for executing first game processing and a program for executing second game processing. The game program is stored in advance in the flash memory 26 or a storage medium attached to the slot 29, and is loaded into the DRAM 27 when the game is executed.

The operation data is data corresponding to operations on the controllers 3 and 4. For example, the operation data is transmitted from the controllers 3 and 4 to the main body apparatus 2 at predetermined time intervals (e.g., intervals of 1/200 seconds), and stored in the DRAM 27 of the main body apparatus 2.

The game object data is data regarding each game object. Specifically, the game object data includes data regarding the player object 61 controlled by the player. The data regarding the player object 61 includes data regarding the position and the orientation of the player object 61, data regarding an item equipped by the player object 61, and data regarding an item that is possessed by the player object 61 and that is in a ready state. The game object data includes data regarding the game object 62, and data regarding the game object 63. The data regarding the game object 62 and the data regarding the game object 63 include data similar to the data regarding the player object 61.

The item placement data is data regarding each item placed in the virtual space, and includes data indicating the type and the position of the item. The item placement data includes data regarding each item originally existing in the virtual space, and data regarding items discharged into the virtual space by the game objects.

The customization data is data that is set when the game is executed in the customization mode. The customization data includes data indicating whether the plurality of items 70 are each an appearable item or a non-appearable item.

The situation table is a table for determining an item to be given to a game object when the game object hits an item box 75. In the situation table, the degree of ease of appearing for each item is set in correspondence with the game situation. Specifically, the situation table includes a situation table for the first game (see FIG. 5) and a situation table for the second game (see FIG. 13 and FIG. 14). The situation table is data created by the game creator, and is stored in advance in the flash memory 26 or an external storage medium attached to the slot 29. The situation table may be stored in a server on the Internet and acquired from the server, for example.

The corrected table is a table generated during the execution of the first game, and is a table generated based on the situation table for the first game and the customization data.

The addition table is a table generated during the execution of the second game and is a table generated based on the situation table for the second game and the customization data.

The equal probability table is a table that is set such that the probability of appearing for each appearable item is the same when the game is executed in the customization mode.

The exception table is a table used in item random selection when an item to be given cannot be determined using the equal probability table when the game is executed in the customization mode. The exception table is stored in advance in the flash memory 26 or an external storage medium attached to the slot 29.

Next, the details of the game processing executed in the game system 1 will be described with reference to FIG. 18 to FIG. 25. The processing shown in FIG. 18 to FIG. 25 is performed by the processor 21 of the main body apparatus 2 executing the game program using the memory (e.g., the DRAM 27). First, processing related to the first game will be described with reference to FIG. 18 to FIG. 22.

First Game Processing

Figure 18:
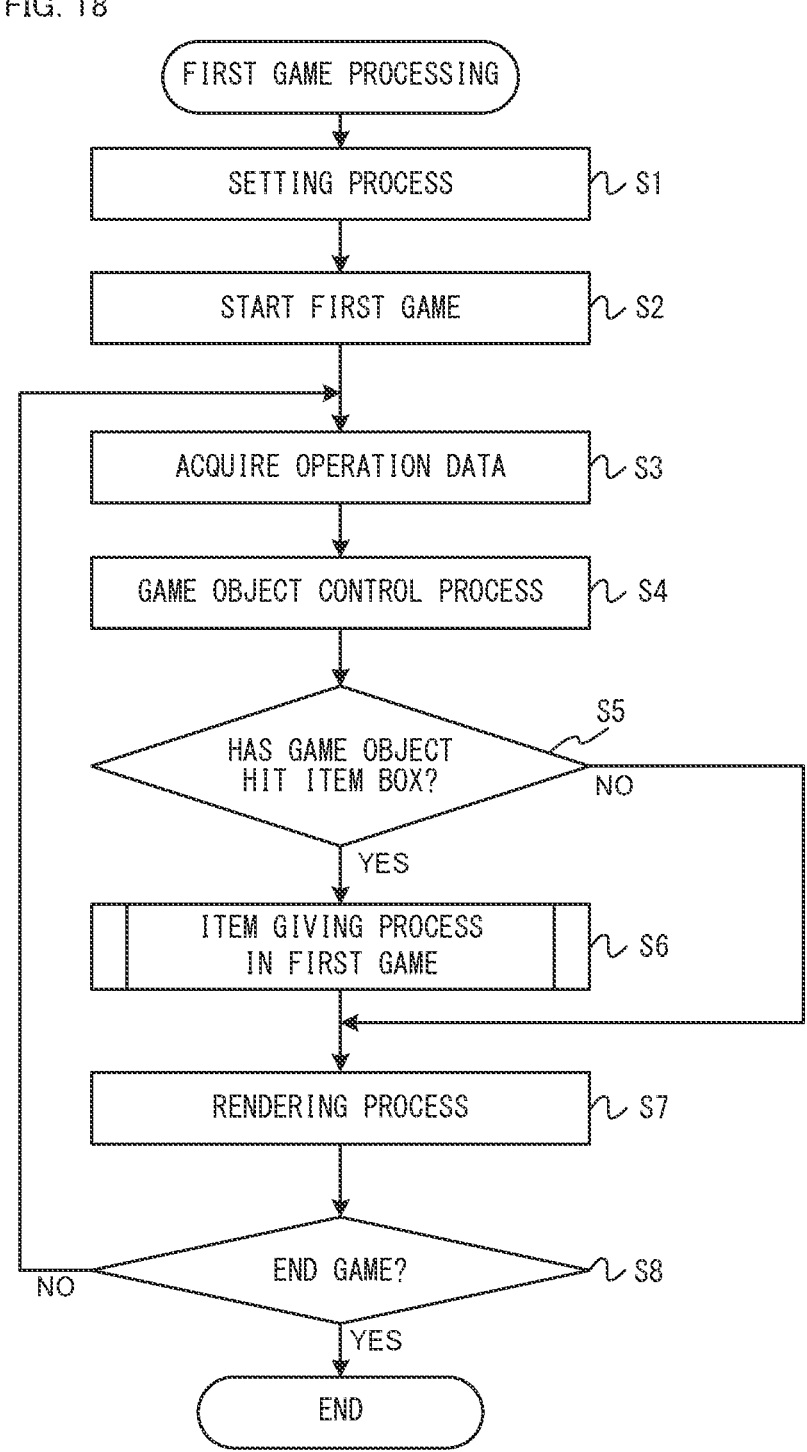
FIG. 18 is an example non-limiting flowchart showing an example of first game processing related to the first game executed in a processor 21.

FIG. 18 is a flowchart showing an example of the first game processing related to the first game executed in the processor 21.

As shown in FIG. 18, first, the processor 21 executes a setting process (step S1). Here, the player selects whether or not to use the customization mode, and when the customization mode is selected, a process of displaying an item setting screen and setting any appearable item or non-appearable item is performed. Specifically, when the customization mode has been selected by the player, the processor 21 displays an item setting screen as shown in FIG. 6. While the item setting screen is displayed, the processor 21 accepts an input from the player, and sets each item to ON or OFF based on the input from the player. When the OK button 82 is pressed by the player on the item setting screen, the processor 21 sets each item that is set to ON at that time, as an appearable item, sets each item that is set to OFF at that time, as a non-appearable item, and stores this setting as customization data. When ON or OFF of each item has not been set by the player on the item setting screen, items that are set to ON by default or all the items may be set as appearable items. When the customization mode has not been selected, the item setting screen is not displayed, and the item-fixed mode is set. Regardless of whether or not an operation is performed by the player, the item setting screen may always be activated. In this case, when at least one item has been set to ON or OFF by the player on the item setting screen, the customization mode may be set, and when ON or OFF of each item has not been set by the player on the item setting screen, the item-fixed mode may be set.

In the setting process in step S1, various settings are performed in addition to the setting of any appearable item or non-appearable item. For example, a course on which the game is performed is set based on an operation by the player. In addition, the processor 21 places item boxes 75 and a plurality of items on the course.

Also, for example, the appearance and the characteristics of the player object 61 are set. In addition, for example, whether to execute the game in the single-player mode or in the multiplayer mode is set. When the game is executed in the single-player mode, the processor 21 sets a plurality of game objects controlled by the processor 21 other than the player object 61. In addition, when the game is executed in the multiplayer mode, the processor 21 sets game object(s) corresponding to other player(s). Specifically, when the game is performed in the multiplayer mode using a plurality of main body apparatuses 2, the processor 21 acquires data regarding the game object(s) selected by the other player(s), from the other main body apparatus(es) 2.

When the game is performed in the multiplayer mode using a plurality of main body apparatuses 2, the processor 21 transmits customization data stored in the main body apparatus 2 including this processor 21, to the other main body apparatus(es) 2. When customization data is stored in the setting process in step S1 in the other main body apparatus(es) 2, the processor 21 receives the customization data transmitted by the other main body apparatus(es) 2, and stores the customization data in the memory.

Also, the processor 21 sets whether to perform the game in a team competition or in an individual competition, based on an operation by the player. When the game is performed in a team competition, the processor 21 sets customization data for each team.

After step S1, the processor 21 starts the first game (step S2). When customization data has been set in step S1 (any appearable item or non-appearable item has been set on the item setting screen), the first game is started in the customization mode. On the other hand, when no customization data has been set in step S1, the first game is started in the item-fixed mode. After the first game is started, the processor 21 repeatedly executes processes in steps S3 to step S8 at predetermined frame time intervals (e.g., intervals of 1/60 seconds). Accordingly, the first game is progressed.

After the first game is started, the processor 21 acquires operation data outputted from the controller 3 and 4 (step S3).

Next, the processor 21 executes a game object control process based on the operation data (step S4). Specifically, for example, when the button 5 of the controller 4 has been pressed, the processor 21 moves the player object 61 forward by a distance equivalent to one frame. In addition, for example, when the analog stick 6 of the controller 3 has been operated, the processor 21 controls the player object 61 such that the player object 61 faces a direction, in the virtual space, corresponding to the input direction of the analog stick 6. Accordingly, the player object 61 moves on the course 50 in response to the operations on the controllers 3 and 4. In addition, when the player object 61 is equipped with an item, the processor 21 causes the player object 61 to use the equipped item, in response to the operations on the controllers 3 and 4. For example, when the item with which the player object 61 is equipped is an item that is discharged into the virtual space and moves in the virtual space, the processor 21 discharges the item in the forward direction of the player object 61 in response to the operations on the controllers 3 and 4. The processor 21 also controls the game objects 62 and 63 other than the player object 61. For example, when the first game is performed in the multiplayer mode, the processor 21 controls the movement of the game object 62 or causes the game object 62 to use an item based on an input to a controller operated by another player. In addition, when the first game is performed in the single-player mode, the processor 21 controls the game objects 62 and 63 according to a predetermined algorithm. For example, the processor 21 controls the movement of the game object 62 or causes the game object 62 to use an item. Moreover, in step S4, a control process related to the used item is performed. For example, when the item has been discharged into the virtual space, the processor 21 moves the item in the virtual space. In addition, the processor 21 determines whether or not the item has collided with any game object. When the processor 21 determines that the item has collided with any game object, the processor 21 generates an effect related to the item. For example, when the item has an effect of temporarily stopping a game object, the processor 21 sets the speed of the game object that has collided with the item, to "0" in step S4. When an item for temporarily increasing the speed of a game object has been used, the processor 21 increases the speed of the game object that has used the item, for a predetermined time in step S4. Accordingly, the game object that has used the item is accelerated for the predetermined time.

Next, the processor 21 determines whether or not any game object has hit an item box 75 (step S5). Specifically, the processor 21 determines whether or not any game object has hit an item box 75, based on the position of each game object updated in step S4 and the positions of the item boxes 75 placed in the virtual space.

When any game object has hit an item box 75 (step S5: YES), the processor 21 executes an item giving process in the first game (step S6). The item giving process is a process for giving an item to the game object that has hit the item box 75. The details of the item giving process in the first game will be described later.

When the process in step S6 has been executed or when NO has been determined in step S5, the processor 21 performs a rendering process (step S7). Specifically, the processor 21 generates an image of the virtual space using a virtual camera that is set behind the player object 61, and outputs the image to the display 12 or a display device different from the display 12.

After step S7, the processor 21 determines whether or not to end the game (step S8). For example, when the player object 61 has reached the goal, the processor 21 determines YES in step S8. In addition, when the end of the game has been instructed by the player, the processor 21 determines YES in step S8. When the processor 21 determines YES in step S8, the processor 21 displays the result of the first game and then ends the processing shown in FIG. 18. On the other hand, when the processor 21 determines NO in step S8, the processor 21 executes the process in step S3 again.

Item Giving Process in First Game

Figure 19:
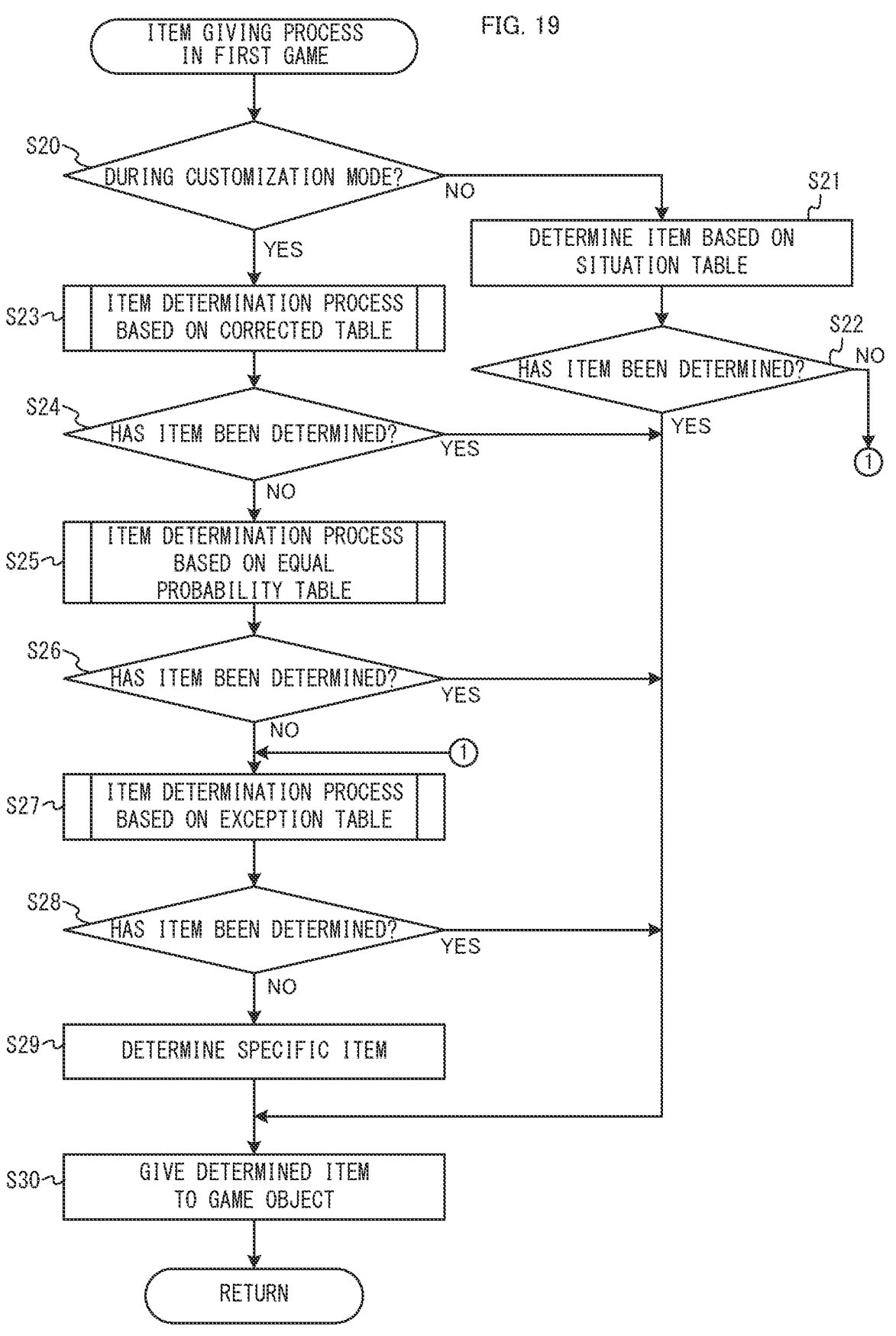
FIG. 19 is an example non-limiting flowchart showing the details of an item giving process in the first game.

Next, the details of the item giving process in the first game in step S6 will be described. FIG. 19 is a flowchart showing the details of the item giving process in the first game.

As shown in FIG. 19, the processor 21 determines whether or not the game is being performed in the customization mode (step S20).

When the game is not being executed in the customization mode (step S20: NO), the processor 21 determines an item to be given to the game object, based on the pre-stored situation table for the first game (step S21). Specifically, the processor 21 determines the current ranking of the game object that has hit the item box 75, and executes item random selection based on the situation table corresponding to this ranking. For example, the processor 21 may calculate a probability of appearing for each item based on the situation table, and may execute item random selection using random numbers such that each item is selected with this probability of appearing. In step S21 as well, random selection is performed except for each item that has reached the upper limit. Specifically, the processor 21 sets the degree of ease of appearing for each item that has reached the upper limit, to 0 in the situation table for the first game, and performs item random selection. Accordingly, the processor 21 determines any item from among the plurality of items 70A to 70L. When the process in step S21 has been executed, the processor 21 then executes a process in step S22.

In step S22, the processor 21 determines whether or not an item has been determined in step S21. When an item has been determined in step S21 (step S22: YES), the processor 21 then executes a process in step S30. On the other hand, when no item has been determined in step S21 (step S22: NO), the processor 21 then executes a process in step S27.

On the other hand, when the game is being executed in the customization mode (step S20: YES), the processor 21 performs an item determination process based on a corrected table (step S23). Hereinafter, the details of the item determination process based on the corrected table in step S23 will be described with reference to FIG. 20.

Item Determination Process Based on Corrected Table

Figure 20:
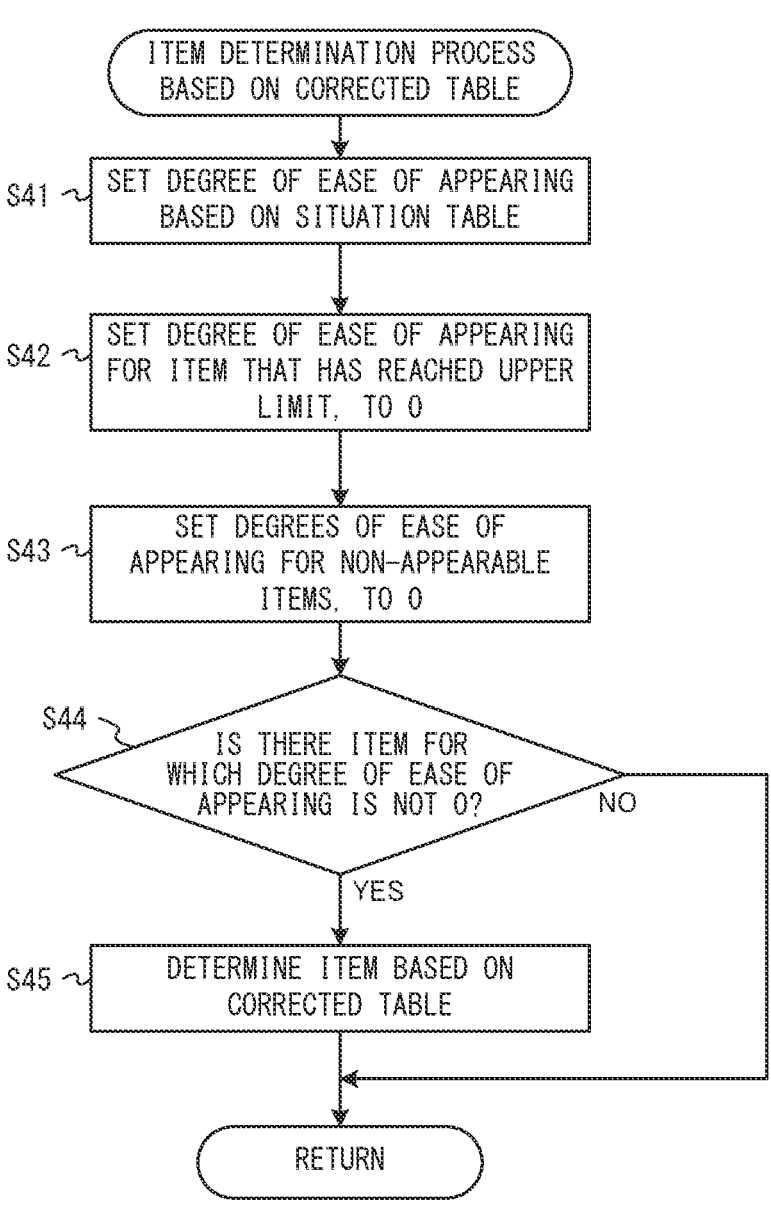
FIG. 20 is an example non-limiting flowchart showing an example of an item determination process based on a corrected table in step S23.

FIG. 20 is a flowchart showing an example of the item determination process based on the corrected table in step S23.

As shown in FIG. 20, the processor 21 sets a degree of ease of appearing for each item based on the situation table corresponding to the game situation (step S41). Specifically, the processor 21 determines the current ranking of the game object that has hit the item box 75, and selects the situation table corresponding to this ranking (the same table as the situation table used in step S21 in FIG. 19). Then, the processor 21 copies the selected situation table.

Next, the processor 21 sets a degree of ease of appearing for each item that has reached the upper limit, to 0 in the copied table (step S42). Specifically, the processor 21 calculates the number of items currently existing in the virtual space for each item type, and determines whether or not each item has reached the upper limit set for the item. Then, the processor 21 sets the degree of ease of appearing for each item that has reached the upper limit, to 0.

After step S42, the processor 21 sets the degree of ease of appearing for each non-appearable item to 0 in the copied table (step S43). Then, the processor 21 stores the results of step S41 to step S43 as a corrected table in the memory.

Next, the processor 21 refers to the corrected table stored in the memory, and determines whether or not there is any item for which the degree of ease of appearing is not 0 (step S44). In step S44, it is determined whether or not it is possible to give any item from among the appearable items, based on the corrected table.

When it has been determined that there is any item for which the degree of ease of appearing is not 0 (step S44: YES), the processor 21 determines an item by performing item random selection using random numbers based on the corrected table (step S45). Specifically, the processor 21 calculates a value obtained by dividing the degree of ease of appearing for each item stored in the corrected table by the total of the degrees of ease of appearing for all the items, as a probability of appearing for this item. Then, the processor 21 determines any item from among the appearable items by performing item random selection based on the calculated probability of appearing.

When the process in step S45 has been executed, or when NO has been determined in step S44, the processor 21 ends the process shown in FIG. 20 and returns the processing to FIG. 19.

Referring back to FIG. 19, the processor 21 determines whether or not an item has been determined in the process in step S23 (step S24).

When an item has been determined in step S23 (step S24: YES), the processor 21 then executes the process in step S30.

On the other hand, when no item has been determined in step S23 (step S24: NO), the processor 21 then executes an item determination process based on an equal probability table (step S25). Hereinafter, the details of the item determination process based on the equal probability table in step S25 will be described with reference to FIG. 21.

Item Determination Process Based on Equal Probability Table

Figure 21:
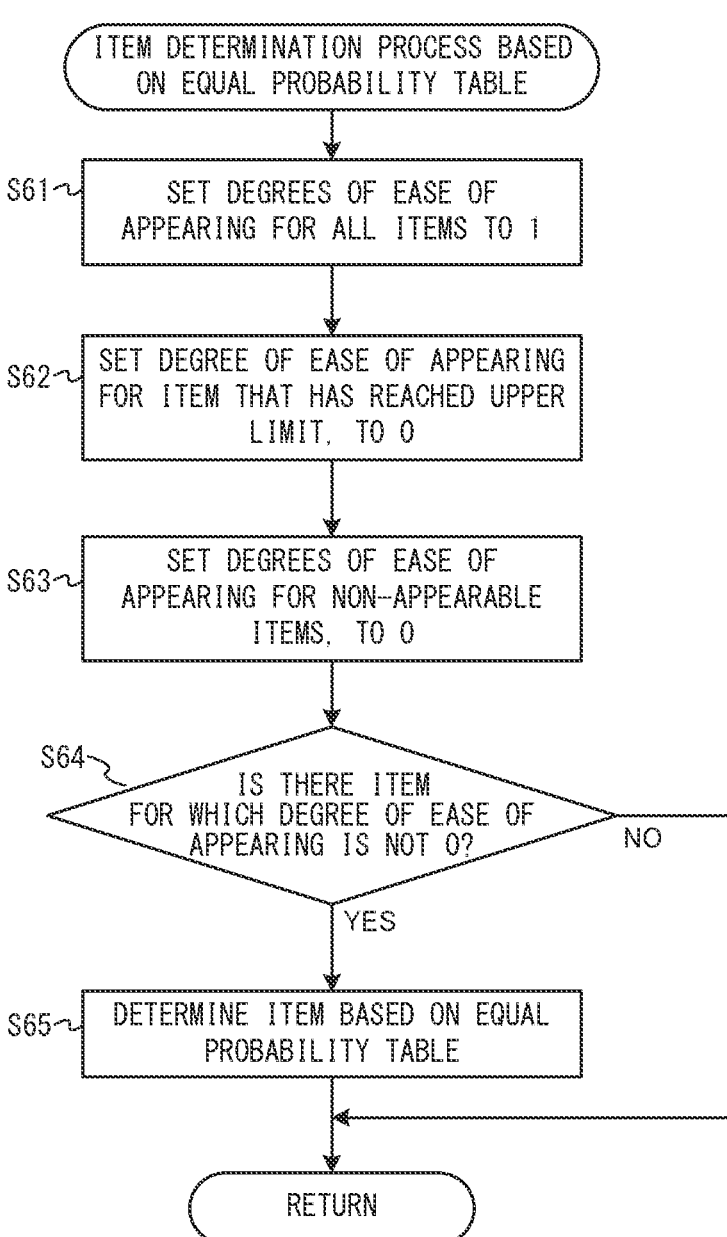
FIG. 21 is an example non-limiting flowchart showing an example of an item determination process based on an equal probability table in step S25.

FIG. 21 is a flowchart showing an example of the item determination process based on the equal probability table in step S25.

As shown in FIG. 21, first, the processor 21 sets the degrees of ease of appearing for all the items to 1 (step S61).

Next, the processor 21 sets the degree of ease of appearing for each item that has reached the upper limit, to 0 (step S62). Specifically, the processor 21 calculates the number of items currently existing in the virtual space for each item type, and determines whether or not each item has reached the upper limit set for the item. Then, the processor 21 sets the degree of ease of appearing for each item that has reached the upper limit, to 0.

After step S62, the processor 21 sets the degree of ease of appearing for each non-appearable item to 0 (step S63). Then, the processor 21 stores the results of the processes in step S61 to step S63 as an equal probability table in the memory.

Next, the processor 21 refers to the equal probability table stored in the memory, and determines whether or not there is any item for which the degree of ease of appearing is not 0 (step S64). In step S64, it is determined whether or not it is possible to give any item from among the appearable items, based on the equal probability table.

When it has been determined that there is any item for which the degree of ease of appearing is not 0 (step S64: YES), the processor 21 determines any item from among the appearable items by performing item random selection using random numbers based on the equal probability table (step S65).

When the process in step S65 has been executed, or when NO has been determined in step S64, the processor 21 ends the process shown in FIG. 21 and returns the processing to FIG. 19.

Referring back to FIG. 19, the processor 21 determines whether or not an item has been determined in the process in step S25 (step S26).

When an item has been determined in step S25 (step S26: YES), the processor 21 then executes the process in step S30.

On the other hand, when no item has been determined in step S25 (step S26: NO), or which no item has been determined in step S21 (step S22: NO), the processor 21 executes an item determination process based on an exception table (step S27). Hereinafter, the details of the item determination process based on the exception table in step S27 will be described with reference to FIG. 22.

Item Determination Process Based on Exception Table

FIG. 22 is a flowchart showing an example of the item determination process based on the exception table in step S27.

As shown in FIG. 22, the processor 21 selects a pre-stored exception table (step S81). In the exception table, degrees of ease of appearing are set in advance for the plurality of items. Different exception tables may be prepared in advance for the first game and the second game. Alternatively, a common exception table may be prepared for the first game and the second game.

Next, the processor 21 sets the degree of ease of appearing for each item that has reached the upper limit, to 0 (step S82). Specifically, the processor 21 calculates the number of items currently existing in the virtual space for each item type, and determines whether or not each item has reached the upper limit set for the item. Then, the processor 21 sets the degree of ease of appearing for each item that has reached the upper limit, among the items included in the exception table, to 0, and stores the setting in the memory.

Next, the processor 21 refers to the exception table stored in the memory, and determines whether or not there is any item for which the degree of ease of appearing is not 0 (step S83).

When it has been determined that there is any item for which the degree of ease of appearing is not 0 (step S83: YES), the processor 21 determines any item from among a predetermined plurality of items by performing item random selection using random numbers based on the exception table (step S84).

When the process in step S84 has been executed, or when NO has been determined in step S83, the processor 21 ends the process shown in FIG. 22 and returns the processing to FIG. 19.

Referring back to FIG. 19, the processor 21 determines whether or not an item has been determined in the process in step S27 (step S28).

When an item has been determined in step S27 (step S28: YES), the processor 21 then executes the process in step S30.

On the other hand, when no item has been determined in step S27 (step S28: NO), the processor 21 determines a specific item (step S29).

When YES has been determined in step S22, when YES has been determined in step S24, when YES has been determined in step S26, when YES has been determined in step S28, or when the process in step S29 has been executed, the processor 21 executes the process in step S30.

In step S30, the processor 21 gives the item determined in each above step (S21, S23, S25, S27, or S29) to the game object. Specifically, in step S30, as shown in FIG. 4, the processor 21 starts variable display of the plurality of items in the upper left region of the screen. After the variable display is started in step S30, the item determined in each above step is stopped after a predetermined time elapses. Accordingly, the item is given to the game object that has hit the item box 75. After step S30, the processor 21 ends the item giving process in the first game in FIG. 19.

Second Game Processing

Figure 23:
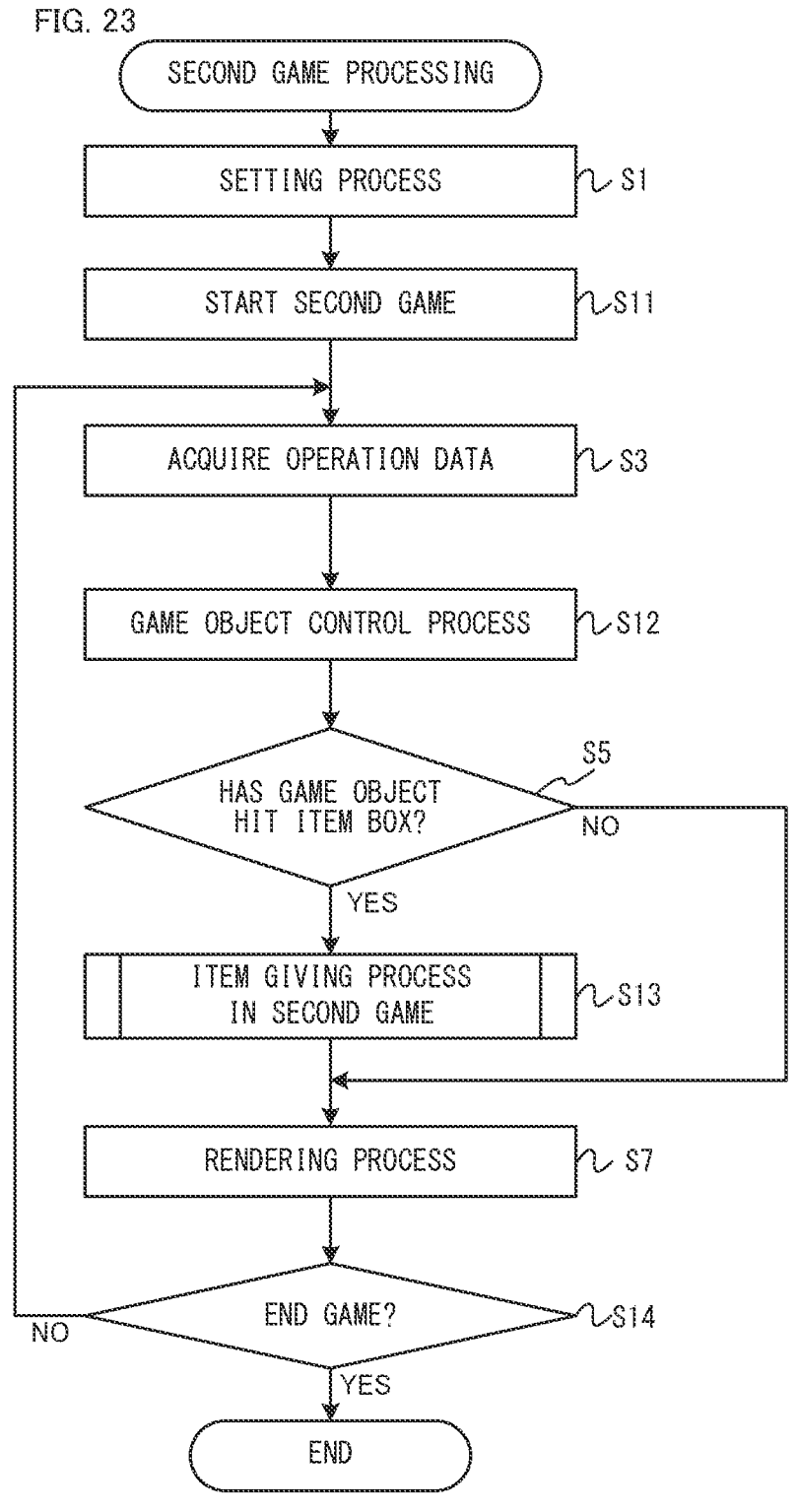
FIG. 23 is an example non-limiting flowchart showing an example of second game processing related to the second game executed in the processor 21.

Next, processing related to the second game will be described with reference to FIG. 23 to FIG. 25. FIG. 23 is a flowchart showing an example of the second game processing related to the second game executed in the processor 21. In FIG. 23, processes different from those in FIG. 18 will be mainly described, but the same processes as those in FIG. 18 are denoted by the same reference characters, and the description thereof is omitted.

As shown in FIG. 23, after a setting process in step S1, the processor 21 starts the second game (step S11).

After the second game is started, the processor 21 executes a game object control process based on operation data (step S12). In the second game, each game object has a predetermined physical strength value (life value). In the game object control process in step S12, each game object is controlled such that the game object attacks an opponent using an item to decrease the physical strength value of the opponent. Specifically, the processor 21 controls the movement of each game object as in the game object control process in step S4. In addition, when each game object is equipped with an item, the processor 21 causes each game object to use the item based on an operation by the player or according to a predetermined algorithm. In addition, the processor 21 determines whether or not the used item has collided with another game object. When the used item has collided with another game object, the processor 21 decreases the physical strength value and the points of the game object hit by the item, and adds points to the game object that has discharged this item.

Next, the processor 21 determines whether or not a game object has hit an item box 75. When a game object has hit an item box 75 (step S5: YES), the processor 21 executes an item giving process in the second game (step S13). The item giving process in the second game is a process for giving an item to the game object that has hit the item box 75. The details of the item giving process in the second game will be described later.

When the process in step S13 has been executed, or when NO has been determined in step S5, the processor 21 performs a rendering process in step S7, and then determines whether or not to end the game (step S14). For example, when a predetermined time has elapsed from the start of the second game, the processor 21 determines YES in step S14. In addition, when the end of the game has been instructed by the player, the processor 21 determines YES in step S14. When YES has been determined in step S14, the processor 21 displays the result of the second game and then ends the processing shown in FIG. 23.

Item Giving Process in Second Game

Next, the details of the item giving process in the second game in FIG. 23 will be described. FIG. 24 is a flowchart showing the details of the item giving process in the second game in FIG. 23.

Figure 24:
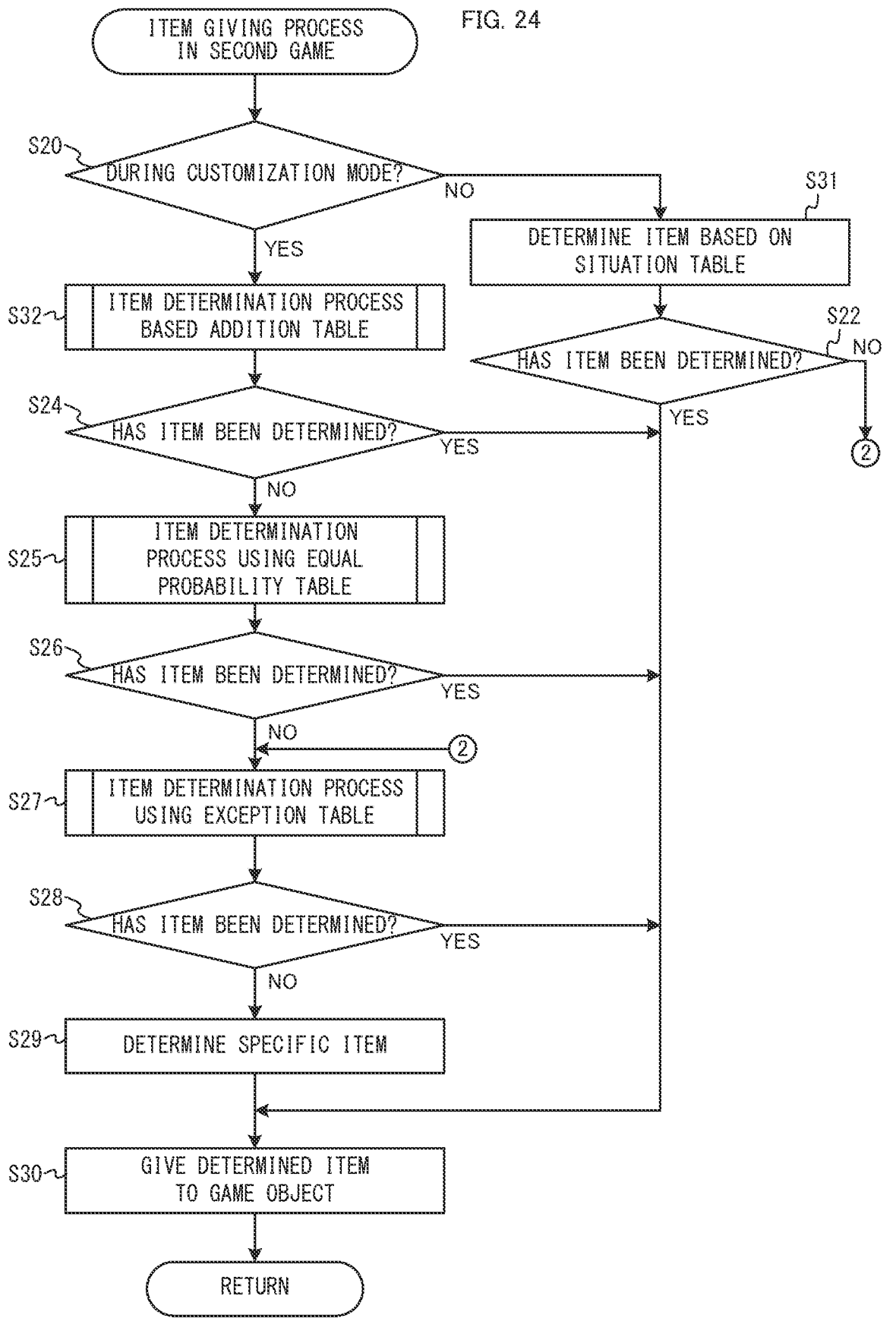
FIG. 24 is an example non-limiting flowchart showing the details of an item giving process in the second game in FIG. 23.

As shown in FIG. 24, when the game is not being executed in the customization mode (step S20: NO), the processor 21 determines an item to be given to the game object, based on the pre-stored situation table for the second game (step S31). In the situation table for the second game, the degree of ease of appearing for each item is set in correspondence with the game situation (specifically, the ranking of the number of points). The processor 21 determines any item from among a plurality of items by executing item random selection based on the situation table corresponding to the ranking of the number of points of the game object when the game object hits the item box 75. In step S31 as well, random selection is performed except for each item that has reached the upper limit.

On the other hand, when the game is being executed in the customization mode (step S20: YES), the processor 21 performs an item determination process based on an addition table (step S32). Hereinafter, the details of the item determination process based on the addition table in step S32 will be described with reference to FIG. 25.

Item Determination Process Based on Addition Table

FIG. 25 is a flowchart showing an example of the item determination process based on the addition table in step S32.

As shown in FIG. 25, the processor 21 sets a degree of ease of appearing for each item based on the situation table corresponding to the game situation of the second game (step S50). Specifically, the processor 21 selects the situation table corresponding to the ranking of the current number of points of the game object that has hit the item box 75 (the same table as the situation table used in step S31 in FIG. 24). Then, the processor 21 copies the selected situation table.

Next, the processor 21 sets the degree of ease of appearing for each item that has reached the upper limit, to 0 in the copied table (step S42). Next, the processor 21 sets the degree of ease of appearing for each non-appearable item, to 0 in the copied table (step S43).

Next, the processor 21 determines whether or not there is any item for which the degree of ease of appearing is not 0 (step S44). When it has been determined that there is any item for which the degree of ease of appearing is not 0 (step S44: YES), the processor 21 calculates the minimum degree of ease of appearing that is not 0 (step S51).

After step S51, the processor 21 adds the minimum degree of ease of appearing calculated in step S51 to the degree of ease of appearing for each appearable item other than each item that has reached the upper limit (step S52). That is, the processor 21 adds the minimum degree of ease of appearing to the degree of ease of appearing for each item other than each item for which the degree of ease of appearing has been set to "0" in step S42 and step S43 among the plurality of items included in the table copied in step S50. Then, the processor 21 stores the results of step S50, step S42, step S43, and step S52 as an addition table in the memory.

Next, the processor 21 determines an item by performing item random selection using random numbers based on the stored addition table (step S53).

When the process in step S53 has been executed, or when NO has been determined in step S44, the processor 21 ends the process shown in FIG. 25 and returns the processing to FIG. 24.

Referring back to FIG. 24, the processor 21 determines whether or not an item has been determined in step S32 (step S24). When an item has been determined in step S32, the processor 21 then executes a process in step S30.

On the other hand, when no item has been determined in the process in step S32 (step S24: NO), the processor 21 then executes an item determination process based on an equal probability table (step S25). The subsequent processes are the same as those in FIG. 19, and thus the description thereof is omitted.

As described above, in the exemplary embodiment, a game, in which a plurality of game objects (61 to 63) including at least one player object 61 operated by the player compete against each other, is performed. Before the game starts, one or more appearable items that can appear in the game are set from an item group including a plurality of items that cause effects in the game, randomly or based on selection by the player (step S1). Item boxes 75 are placed in the virtual space, and when a game object hits an item box 75 during the game, any item is determined from among the appearable items based on the pre-stored situation table corresponding to the game situation (step S45 or step S53). When any item cannot be determined from among the appearable items based on the situation table (step S24: NO), an item is determined from among the appearable items based on the equal probability table different from the situation table (step S25).

Accordingly, an appropriate item can be given according to the game situation, and an item that can be given can be set by an operation by the user, so that it is possible to provide unconventional entertainment characteristics. In addition, it is possible to improve the degree of freedom while maintaining the balance of the game. For example, it is conceivable to change the degree of ease of being given for each item according to the game situation, but when the number of items is large, the number of patterns that can be set by the player becomes large, and it is difficult to prepare tables corresponding to game situations for all such patterns. In the exemplary embodiment, in the customization mode, the correspondence table used in common with the item-fixed mode is corrected based on the customization data, whereby each item can be given with an appropriate probability according to the game situation even when tables for all patterns of appearable items that can be set are not prepared.

In the exemplary embodiment, even when the game is executed in the customization mode, an item is given using the same table as the pre-stored situation table that is normally used (used in the item-fixed mode). Therefore, even when a table dedicated for the customization mode is not prepared, any item to be given can be determined from among the appearable items according to the game situation.

In the exemplary embodiment, when any item cannot be given from among the appearable items based on the pre-stored situation table, any item is given from among the appearable items using the equal probability table different from the situation table. It is not possible to predict what items will be set as appearable items by a player, and it is difficult to set degrees of ease of appearing for all patterns in advance. However, in the exemplary embodiment, first, an attempt to give any item from among the appearable items based on the preset situation table is made, and when any item cannot be given based on the situation table, any item is given from among the appearable items using the equal probability table. When an item is given from among the appearable items using the pre-stored situation table, a situation in which there is no item that can be given, may occur depending on the setting of the appearable items. Even in such a case, random selection is performed using the equal probability table, so that a situation in which an item cannot be given from among the appearable items can be avoided. In addition, since random selection is performed using the equal probability table while priority is given to random selection using the situation table, each item can be given with an appropriate probability as a whole, regardless of how the appearable items are set.

In the second game, in the pre-stored situation table, for a first item, a value larger than "0" (value indicating that the item is capable of being given) is set as a degree of ease of appearing, and for a second item, "0" (value indicating that the item is not capable of being given) is set as a degree of ease of appearing. When the second game is executed in the customization mode, a value larger than "0" is set as the degree of ease of appearing for the second item. Accordingly, the second item, which normally cannot be given (in the item-fixed mode), can be given in the customization mode. In addition, addition is made to the degree of ease of appearing for the second item, and addition is also made to the degree of ease of appearing for the first item. Accordingly, the second item, which normally cannot appear, can be prevented from relatively excessively appearing in the customization mode, thereby maintaining the balance of the game. Furthermore, since the minimum degree of ease of appearing among the plurality of appearable items is added to the degree of ease of appearing for each appearable item, the second item can be prevented from excessively appearing in the customization mode.

In the exemplary embodiment, when the game is performed in a team competition, appearable items can be set for each team. Thus, different items can be given for each team, and the setting of the appearable items can be used for team strategy. Accordingly, the entertainment characteristics in a team competition can be improved.

In the exemplary embodiment, an upper limit number of items that can exist in the game is set in advance for each item type, and an item that has not reached the upper limit number is given from among the appearable items. Accordingly, a specific item can be prevented from excessively appearing. Even when a certain item has reached the upper limit number, another item can be given.

In the exemplary embodiment, even when any item cannot be given from among the appearable items using the equal probability table, any item can be given from among predetermined one or more items using the exception table. Accordingly, no matter how the appearable items are set, an item can be reliably given.

Modifications

Although the exemplary embodiment has been described above, the above embodiment is merely an example, and, for example, the following modifications may be made.

For example, the processes shown in the above flowcharts are merely illustrative, and the order, contents, etc., of the processes may be changed as appropriate. For example, in the above flowcharts, a corrected table (or addition table) in which the degree of ease of appearing for each appearable item is set is generated based on the situation table, and an item is determined from among the appearable items based on the generated corrected table (or addition table) (step S23 or step S32). When an item cannot be determined in this process (step S24: NO), the item determination process using the equal probability table is performed. The processes do not necessarily have to be performed in this order. For example, before a corrected table (or addition table) is generated, it may be determined whether or not any item can be determined from among the appearable items based on the situation table, and when it is determined that any item can be determined, a corrected table (or addition table) is generated, and item random selection may be performed using the corrected table (or addition table). When it is determined that any item cannot be determined, no corrected table (or addition table) may be generated, and an item determination process using the equal probability table may be performed.

In the above embodiment, it is assumed that the first game and the second game have an item-fixed mode and a customization mode. However, in another exemplary embodiment, the first game and the second game may have only a customization mode. In this case, a situation table corresponding to the game situation may be stored in advance, the above-described process may be performed based on the customization data using this situation table, and item random selection may be performed based on a table corresponding to the result of the process.

In the above embodiment, item random selection is performed using the corrected table in which the degree of ease of appearing for each non-appearable item is set to "0" in the pre-stored situation table, but any item may be selected as an item to be given from among the appearable items by another method. For example, in the pre-stored situation table, instead of setting the degree of ease of appearing for each non-appearable item to "0", each non-appearable item may be masked, or only each appearable item may be extracted, and any item may be selected from among the appearable items by random selection.

In addition, item random selection may be performed based on a plurality of pre-stored situation tables. For example, a first situation table focusing on a first parameter representing the game situation and a second situation table focusing on a second parameter may be stored in advance, a plurality of situation tables corresponding to these parameters may be selected as the game situation when a game object hits an item box, and a degree of ease of appearing for each item may be calculated based on the selected situation tables. For example, the degree of ease of appearing for each item may be calculated by multiplying (and/or adding) the degree of ease of appearing based on the first situation table and the degree of ease of appearing based on the second situation table. Then, a value obtained by dividing the calculated degree of ease of appearing for each item by the total of the degrees of ease of appearing for the respective items may be used as a probability of appearing for each item.

In the above embodiment, when a game object hits any item box 75 placed in the virtual space, item random selection is performed. However, when a game object satisfies a predetermined condition, item random selection may be performed. The predetermined condition may be any condition. For example, the predetermined condition may be that a game object passes through a specific region or position in the virtual space, that a game object collides with an opponent game object, that a game object exercises a right for acquiring an item, that a parameter regarding a game object reaches a predetermined value, etc.

In the above embodiment, a game object is caused to possess an item given thereto, and is caused to use the given item in response to an instruction from the player (or at a predetermined timing according to a predetermined algorithm). In another exemplary embodiment, at the moment when an item is given, the item may be used to generate the effect of the item. That is, "giving" an item to a game object is not limited to causing the game object to possess the item, and includes immediately causing the game object to use the item.

In the above embodiment, any item is given from among the appearable items based on the pre-stored situation table (first data) corresponding to the game situation, and when an item cannot be given based on the first data, any item is given from among the appearable items based on the equal probability table (second data). The first data and the second data are not limited to the data stored in a table format. The second data is not limited to the data that is set such that the degree of ease of appearing for each item is equal. For example, the second data may be set such that the degree of ease of appearing for each item is different regardless of the game situation. Also, the second data may be any data different from the first data. For example, the second data may be data based on which items, the number of which is larger than the number of items that can be given based on the first data, can be given.

In the above embodiment, each item has an effect of attacking a game object that is an opponent, an effect of nullifying or reducing an attack from an opponent game object, an effect of accelerating a game object, or the like. In another exemplary embodiment, items that have other effects during the game may be prepared. For example, an item for temporarily stopping or decelerating all game objects other than a game object that uses this item, may be prepared. In addition, in addition to the items that cause effects during the game, for example, an item that causes an effect at the end of the game may be prepared. For example, in a game in which points acquired during the game are calculated at the end of the game and a win or a loss is determined based on the number of points, when a game object acquires a specific item during the game, points may be added based on the specific item at the end of the game.

In the above embodiment, any appearable item or non-appearable item is set on the item setting screen before the game starts. However, in another exemplary embodiment, during the execution of the game, it may be possible to activate the item setting screen and set any appearable item or non-appearable item thereon. For example, it may be possible to interrupt the game being executed, activate the item setting screen, and set any appearable item.

In the above embodiment, in the second game, addition is made to the degrees of ease of appearing for all appearable items. In another exemplary embodiment, only when there is at least one item for which the degree of ease of appearing is "0" among appearable items, the minimum degree of ease of appearing may be added for all the appearable items. That is, when the degrees of ease of appearing for all the appearable items are larger than "0", no degree of ease of appearing may be added, and only when there is at least one item for which the degree of ease of appearing is "0" among a plurality of appearable items, addition may be made to the degrees of ease of appearing for all the appearable items.

In the second game, only when an item for which the degree of ease of appearing is set to "0" in the situation table (item that cannot be given) is set as an appearable item, a process of making addition to the degree of ease of appearing for each appearable item may be performed.

In the second game, for example, with the situation table for mode A, first items (70G to 70L) do not appear; with the situation table for mode B, second items (70A to 70F) do not appear; and in the customization mode, it is made possible for the first items to appear by performing the above addition process on the situation table for mode A. In another exemplary embodiment, there may be third items that do not appear in mode A and also do not appear in mode B, and the third items may be set as appearable items on the item setting screen, and may be caused to appear.

For each item, a parameter indicating the degree of ease of being given may be set. This parameter may represent a degree of ease of appearing (the height of the probability of appearing) for the item as in the above embodiment, may represent the degree of difficulty appearing (the lowness of the probability of appearing) for the item, or may represent the probability of appearing for the item itself.

In the above embodiment, when a game object satisfies a predetermined condition (e.g., when a game object hits an item box 75), any item is determined as an item to be given from among the appearable items other than each item that has reached the upper limit number. In another exemplary embodiment, no upper limit number may be set for each item, and any item may be determined as an item to be given from among appearable items. In addition, instead of the upper limit number for each item, only an item that satisfies another condition among appearable items may be determined as an item to be given.

In the above embodiment, it is assumed that a racing game in which game objects moves on a course and a game in which a plurality of game objects battle are performed. The above-described methods for setting appearable items and giving an item may be applied to other games. For example, in a game such as a shooting game, an action game, and a puzzle game, appearable items may be set as described above, and when a game object satisfies a predetermined condition during the game, any item may be given from among the set appearable items.

The above-described processing may be executed in any other information processing apparatus or information processing system in addition to the game system 1. The information processing system may include a plurality of apparatuses, and the plurality of apparatuses may be connected to each other via a network (e.g., a LAN, the Internet, or the like). The information processing system may include a plurality of processors and a plurality of storage media having the above game program stored therein, and the plurality of processors may share and execute the above processing.

The configurations according to the above embodiment and the modifications thereof may be combined together as desired as long as the configurations do not contradict each other. The above is merely an example of the exemplary embodiment, and various modifications and variations may be made.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein instructions that, when executed, cause a computer to execute game processing of a game in which a plurality of game objects including at least one player object operated by a user compete against each other, the game processing comprising:

displaying, on a display device, a game image that includes a view of the plurality of game objects that are moving in a virtual space;

controlling, based on user provided input, the at least one player object to move within the virtual space;

setting one or more appearable items capable of appearing during the game, from an item group including a plurality of types of items causing effects in the game, randomly or based on selection by the user;

based on determination a game object that is located within the virtual space satisfies a predetermined condition during the game, performing an item selection process to select an item for the game object from the item group; and wherein the item selection process includes:

accessing pre-prepared data that includes a plurality of preset probability parameters, dynamically generating first data that includes one or more probability parameters based on a current game situation in the game that relates to a result of the game, wherein the first data is generated based on, but different from, the accessed pre-prepared data, and as a result of no item selection from the dynamically generated first data, accessing second data that is different from the first data and selecting the item.

2. The storage medium according to claim 1, wherein the game processing further comprises:

a third process of setting a degree of ease of being given for each of the appearable items based on the first data, and wherein the item selection process is executed based on the set degree of ease of being given for each of the appearable items after the third process.

3. The storage medium according to claim 1, wherein the game processing further comprises executing the game in an item-fixed mode in which, in the determining the item to be given, any item is determined as the item to be given from among a plurality of types of fixed items in correspondence with a game situation, and the first data is data used to determine any item from among the plurality of types of fixed items, as the item to be given, when the game is executed in the item-fixed mode.

4. The storage medium according to claim 3, wherein in the first data, the parameter of a first item is set to a value indicating that the item is capable of being given, and the parameter of a second item is set to a value indicating that the item is not capable of being given, and when the appearable items include the second item, the parameter of the second item is set to a value indicating that the item is capable of being given.

5. The storage medium according to claim 4, wherein, when the appearable items include the first item and the second item, the parameter of the second item is set to a value indicating that the item is capable of being given, and the parameter of the first item is set such that a degree of ease of being given for the first item is increased.

6. The storage medium according to claim 4, wherein, when the appearable items include at least one first item, the parameter of the second item is set based on a lowest degree of ease of being given among said at least one first item.

7. The storage medium according to claim 1, wherein the second data is data for determining any item from among the appearable items with an equal probability.

8. The storage medium according to claim 1, wherein each of the plurality of game objects belongs to any of a plurality of teams, the game is a game in which the plurality of teams compete against each other, and the appearable items are set for each team in the setting of the appearable items.

9. The storage medium according to claim 1, wherein an upper limit number of items that can exist during the game is set for each of the plurality of types of items, and in the determining the item to be given, an item whose number of items existing during the game is less than the upper limit number, among the appearable items, is determined as the item to be given.

10. The storage medium according to claim 9, wherein, when all the appearable items each have reached the upper limit number, any item is determined from among one or more predetermined items included in the item group, as the item to be given, regardless of whether said one or more predetermined items are set as the appearable items.

11. An information processing system for executing a game in which a plurality of game objects including at least one player object operated by a user compete against each other, the information processing system comprising one or more processors configured to execute game processing of the game, the game processing comprising:

displaying, on a display device, a game image that includes a view of the plurality of game objects that are moving in a virtual space;

controlling, based on user provided input, the at least one player object to move within the virtual space;

setting one or more appearable items capable of appearing during the game, from an item group including a plurality of types of items causing effects in the game, randomly or based on selection by the user;

based on determination a game object that is located within the virtual space satisfies a predetermined condition during the game, performing an item selection process to select an item for the game object from the item group; and wherein the item selection process includes:

accessing pre-prepared data that includes a plurality of preset probability parameters, dynamically generating first data that includes one or more probability parameters based on a current situation in the game that relates to a result of the game, wherein the first data is generated based on, but different from, the accessed pre-prepared data, and as a result of no item selection from the dynamically generated first data, accessing second data that is different from the first data and selecting the item.

12. An information processing method performed in an information processing system for executing a game in which a plurality of game objects including at least one player object operated by a user compete against each other, the information processing method comprising:

displaying, on a display device, a game image that includes a view of the plurality of game objects that are moving in a virtual space;

controlling, based on user provided input, the at least one player object to move within the virtual space;

setting one or more appearable items capable of appearing during the game, from an item group including a plurality of types of items causing effects in the game, randomly or based on selection by the user;

based on determination a game object that is located within the virtual space satisfies a predetermined condition during the game, performing an item selection process to select an item for the game object from the item group; and wherein the item selection process includes:

accessing pre-prepared data that includes a plurality of preset probability parameters, dynamically generating first data that includes one or more probability parameters based on a current situation in the game that relates to a result of the game, wherein the first data is generated based on, but different from, the accessed pre-prepared data, and as a result of no item selection from the dynamically generated first data, accessing second data that is different from the first data and selecting the item.

13. The information processing method according to claim 12, further comprising setting a degree of ease of being given for each of the appearable items based on the first data, wherein the item to be given is determined based on the set degree of ease of being given for each of the appearable items.

14. The information processing method according to claim 12, further comprising executing the game in an item-fixed mode in which, in the determining the item to be given, any item is determined as the item to be given from among a plurality of types of fixed items in correspondence with a game situation, wherein the first data is data used to determine any item from among the plurality of types of fixed items, as the item to be given, when the game is executed in the item-fixed mode.

15. The information processing method according to claim 14, wherein in the first data, the parameter of a first item is set to a value indicating that the item is capable of being given, and the parameter of a second item is set to a value indicating that the item is not capable of being given, and when the appearable items include the second item, the parameter of the second item is set to a value indicating that the item is capable of being given.

16. The information processing method according to claim 15, wherein, when the appearable items include the first item and the second item, the parameter of the second item is set to a value indicating that the item is capable of being given, and the parameter of the first item is set such that a degree of ease of being given for the first item is increased.

17. The information processing method according to claim 15, wherein, when the appearable items include at least one first item, the parameter of the second item is set based on a lowest degree of ease of being given among said at least one first item.

18. The information processing method according to claim 12, wherein the second data is data for determining any item from among the appearable items with an equal probability.

19. The information processing method according to claim 12, wherein each of the plurality of game objects belongs to any of a plurality of teams, the game is a game in which the plurality of teams compete against each other, and the appearable items are set for each team in the setting of the appearable items.

20. The information processing method according to claim 12, wherein an upper limit number of items that can exist during the game is set for each of the plurality of types of items, and in the determining the item to be given, an item whose number of items existing during the game is less than the upper limit number, among the appearable items, is determined as the item to be given.

* * * * *